(12) United States Patent
Ishizuka et al.

(10) Patent No.: US 7,233,741 B2
(45) Date of Patent: Jun. 19, 2007

(54) OPTICAL EXCHANGE FOR WAVELENGTH DIVISION MULTIPLEXED (WDM) NETWORK, AND OPTICAL EXCHANGE METHOD FOR WDM NETWORK

(75) Inventors: Atsuo Ishizuka, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1116 days.

(21) Appl. No.: 10/101,283

(22) Filed: Mar. 20, 2002

(65) Prior Publication Data

US 2003/0081283 A1     May 1, 2003

(30) Foreign Application Priority Data

Oct. 31, 2001    (JP)    .............. 2001-334807

(51) Int. Cl.
*H04J 14/02* (2006.01)
(52) U.S. Cl. ................... 398/48; 398/93; 398/94; 398/95
(58) Field of Classification Search ........... 398/45–57, 398/68–72, 75
See application file for complete search history.

(56) References Cited

U.S. PATENT DOCUMENTS

| | | | | |
|---|---|---|---|---|
| 5,933,270 A | 8/1999 | Toyohara | ........... | 359/341 |
| 6,149,278 A | 11/2000 | Mao et al. | ........... | 359/862 |
| 6,282,361 B1 | 8/2001 | Nishimura et al. | ........ | 385/140 |
| 6,333,805 B1 | 12/2001 | Kamata | | |
| 2004/0258408 A1* | 12/2004 | Ramaswami et al. | ........ | 398/50 |

FOREIGN PATENT DOCUMENTS

| | | |
|---|---|---|
| EP | 1 091 219 A2 | 4/2001 |
| JP | 10-503853 | 4/1998 |
| JP | 10-173597 | 6/1998 |
| JP | 2000-180803 | 6/2000 |
| JP | 2000-332691 | 11/2000 |
| JP | 2001-086066 | 3/2001 |
| JP | 2001-133706 | 5/2001 |
| JP | 2000-131626 | 12/2002 |
| WO | 95/33219 | 12/1995 |
| WO | 01/07945 | 2/2001 |

OTHER PUBLICATIONS

Japanese Office Action issued on Nov. 8, 2006 in Japanese Application No. 2001-334807.

* cited by examiner

*Primary Examiner*—Leslie Pascal
(74) *Attorney, Agent, or Firm*—Staas & Halsey LLP

(57) ABSTRACT

An optical exchange for a wavelength division multiplexed (WDM) network performs a switching operation on a plurality of optical signals, which are input via a plurality of input ports, and outputs the resulting optical signals to a plurality of output ports, which are allocated to the input ports, by making deflection the optical signal; target amounts of the deflection to which the respective input optical signals are stored. The deflection is made using a switching controller, which reads out the target amount of deflection for such destination-of-switching output port with respect to such object-of-switching port, and controlling the deflection in such a manner that the individual input optical signals are deflected based on the respective target amounts of deflection. And during the switching, the power-level controller performs a feedback control for adjusting a power level of the individual deflected output optical signal to a target power level.

19 Claims, 18 Drawing Sheets

F I G. 3

| INPUT CHANNEL (PORT) | DESTINATION-OF-SWITCHING CHANNEL (PORT) #1 | ... | DESTINATION-OF-SWITCHING CHANNEL (PORT) #N |
|---|---|---|---|
| #1 | < DEFLECTION AMOUNT, ANGLE > | ---------- | < DEFLECTION AMOUNT, ANGLE > |
| ... | ---------- | ---------- | ---------- |
| #N | < DEFLECTION AMOUNT, ANGLE > | ---------- | < DEFLECTION AMOUNT, ANGLE > |

7A

F I G. 5

| GAIN G | λ1 | λ2 | ... | λn |
|---|---|---|---|---|
| G1 | g 11 | g 21 | ... | g n1 |
| G2 | g 12 | g 22 | ... | g n2 |
| ⋮ | ⋮ | ⋮ | | ⋮ |
| Gm | g 1m | g 2m | ... | g nm |

7C(16A)

NOTE:
G REPRESENTS A GAIN OF THE OPTICAL AMPLIFIER, AND
g REPRESENTS A GAIN FOR AN INDIVIDUAL WAVELENGTH.

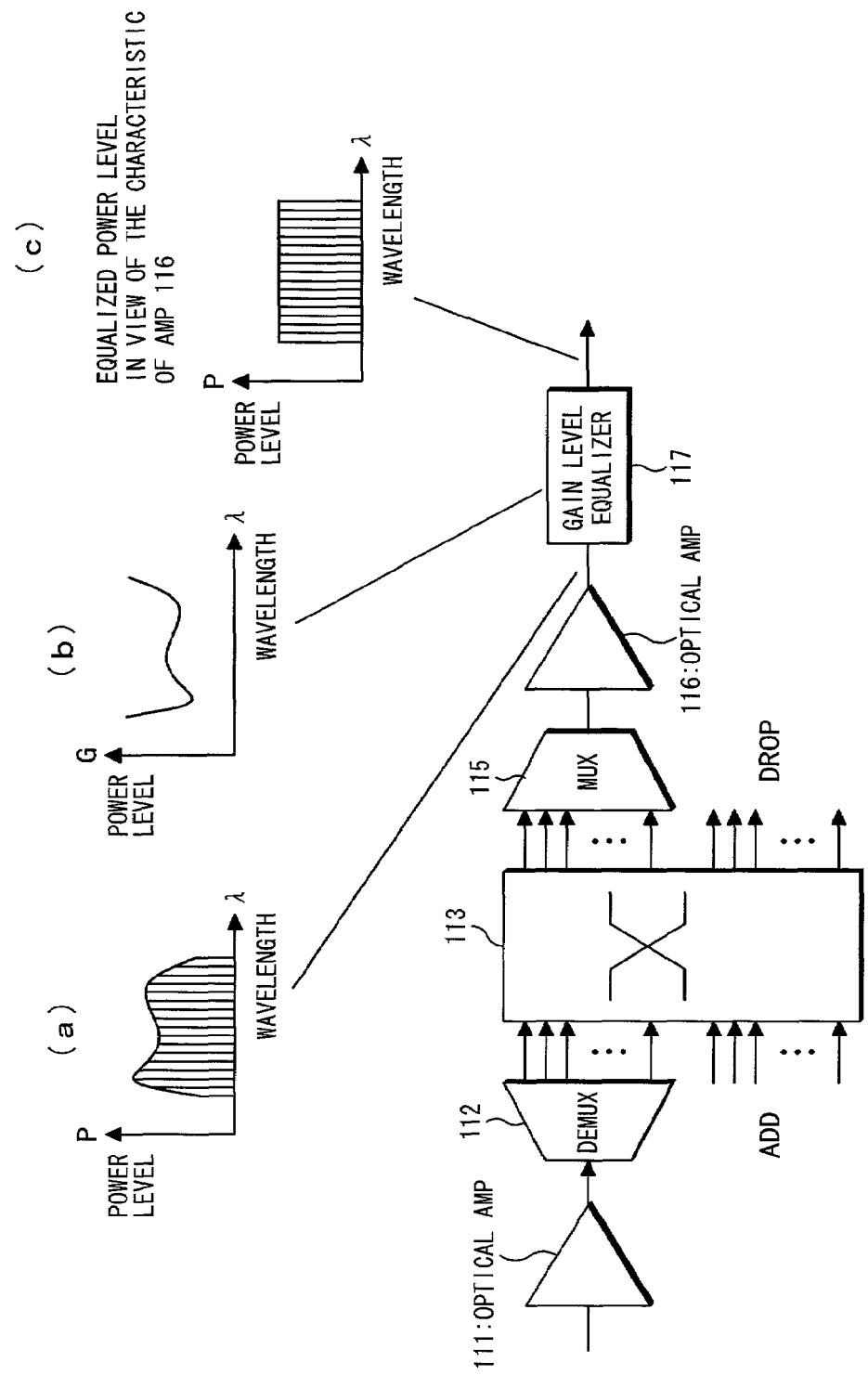

OPTICAL EXCHANGE FOR WAVELENGTH DIVISION MULTIPLEXED (WDM) NETWORK, AND OPTICAL EXCHANGE METHOD FOR WDM NETWORK

BACKGROUND OF THE INVENTION

1. Field of the Invention

The present invention relates to an optical exchange and an optical exchange method which are suitable for optical cross-connects, optical add/drop multiplexers, wavelength routers and etc. in high-speed large-capacity WDM (Wavelength Division Multiplexed) systems.

2. Description of the Related Art

Nowadays as the population of the Internet has spread explosively, traffic in the Internet is on the drastic increase. Wavelength division multiplexing (WDM) has been popular as one of the best means to build a large-capacity optical communications network.

FIG. 14 of the accompanying drawings schematically shows a conventional optical cross-connect (OXC) system for a trunk optical network according to WDM. The OXC system 100 comprises a plurality of optical switches 101-1 through 101-4 (only four depicted in FIG. 14) each connected to adjacent ones via optical fibers 102. Assuming that wavelength-division-multiplexed (WDM) optical signals are input to a particular one of the optical switches 101-1 through 101-4 via optical fibers, the particular optical switch cross-connects the input optical signals in terms of wavelengths and performs wavelength multiplexing over prospective output optical signals to be transmitted to the same destination switch, whereupon the resultant wavelength-multiplexed optical signals are transmitted to the selected destination switch.

If a trouble or fault has occurred in an optical fiber 102 in the OXC system 100 of FIG. 14, the system 100 automatically and instantly diverts the output optical signals onto a protection optical fiber (or another optical fiber) 102.

FIG. 15 schematically shows a conventional optical add/drop multiplexing (OADM) system 200. The OADM system 200 comprises a plurality of optical switches 201-1 ... 201-5 (only five depicted in FIG. 15) connected one to another in a ring topology. Of the five optical switches, three switches 201-1, 201-3, 201-4 are each equipped with a router 202, 203, 204. And of the two remaining optical switches, one optical switch 201-2 is connected to another optical switch 201-6 and the other optical switch 201-5 is connected to a SONET (Synchronous Optical NETwork) system 205.

The OADM ring system 200 is used in a regional network or metropolitan area network (MAN), which is branched from a trunk network or wide area network (WAN); optical signals can be transferred from the ring line of the OADM system 200 to the regional network and vice versa without being converted between electric and optic for every wavelength. When the traffic at a point in the regional network, the OADM ring system 200 dynamically changes allocation of wavelengths to thereby automatically expand the wavelength band and hence to increase the transmission capacity so that the network configuration automatically varies to meet the local traffic in the regional network.

FIG. 16 shows the details of the individual optical switch 110 in the OXC system 100 or OADM system 200, comprising a first optical amplifier 111, an optical demultiplexer 112, an optical switch device 113, a variable attenuator 114, an optical multiplexer 115, a second optical amplifier 116, and a gain-level equalizer 117.

In the optical switch 110, the first optical amplifier 111 amplifies the optical signals that have lowered in level as transmitted over a long distance through an optical fiber. The resulting optical signals are demultiplexed by the optical demultiplexer 112 in terms of wavelengths. Then the optical switch device 113 performs a switching operation, such as cross-connector add/drop, on the demultiplexed optical signals.

And the variable attenuator 114 attenuates/equalizes power levels of the individual switched optical signals (e.g., in the ring line of FIG. 15) in terms of the wavelengths. The multiplexer 115 performs wavelength multiplexing on the attenuated/equalized optical signals. Then the wavelength-multiplexed optical signals are amplified by the second amplifier 116, and the individual gain levels of the resulting optical signals are equalized by the gain-level equalizer 117.

In short, the WDM system, such as the OXC system 100 in FIG. 14 and OADM system 200 in FIG. 15, transmits the wavelength multiplexed optical signals between long-distance end devices through the optical fiber. During this long-distance transmission, the power levels tend to stagger between the individual optical signals of every wavelength, causing not only a narrowed transmission band but also an impaired SNR (signal-to-noise ratio) the WDM system partly due to the lowered optical power level.

Further, the first and second amplifiers 112, 116 are exemplified by erbium doped fiber amplifiers (EDFA), whose gain band is approximately tens nm as a single amplifier is used. But, as a common knowledge in the art, when two or more EDFAs are used as connected one to another, a wavelength gain difference would occur because their wavelength-gain characteristics are emphasized, narrowing the gain band to the extremity. It is also known that, in optical amplification according to EDFA, the optical signals of the wavelength however lower in gain would be buried in naturally emitting incoherent adjacent optical signals of the wavelength higher in gain.

Evenness of gain characteristics of the first and second optical amplifiers 112, 116 as connected in series is therefore essential to compensate possible loss of the SNR. Generally, however, a wavelength-gain characteristic of EDSA has two peaks in the wavelength band and is hence uneven.

Meanwhile, the variable attenuator 114 attenuates/equalizes the staggered power levels of every wavelength shown in (a) of FIG. 17 to obtain the even power level shown in (b) of FIG. 17. The gain-level equalizer 117 (FIG. 6) is omitted here in FIG. 17 for clarity of description.

And the gain-level equalizer 117 equalizes the staggered power levels of the wavelength-multiplexed optical signals shown in (a) of FIG. 18 to the even power level shown in (c) of FIG. 18 by imposing an inverted characteristic of the gain of the amplifier 116 shown in (b) of FIG. 18 over the gain of the amplifier 116. The variable attenuator 114 (FIG. 16) is omitted here in FIG. 18 for clarity of description.

However, the optical switch 110 of FIG. 16 encounters the following problems because of the variable attenuator 114 and the gain-level equalizer 117.

First, the gain-level equalizer 117 may be realized by an optical filter, such as a Fabry-Perot-etalon filter or a Fiber Bragg Grating (FBG), disposed downstream of the second amplifier 116 as EDFA; because the wavelength-gain characteristic of every practical EDFA is originally complex, it is very difficult to design a filter having such a filter characteristic as to meet an inverted one of the complex EDFA characteristic.

Further, a somehow precise gain-equalization filter can be realized by combining two or more optical filters that correspond one to each of Fourier series terms, which are obtained by approximation. For an improved accuracy, however, it is necessary to connect plural optical filters in series, which would increase the loss of transmission as well as the system size.

Furthermore, the variable attenuator 114 can be realized by placing a Mach-Zehnder interferometer and a semiconductor optical amplifier (SOA) gate, which are to be controlled, respectively in two parallel waveguides for optical signals of the corresponding wavelengths. It is however difficult to compensate either possible wavelength dependency or deflection dependency due to the user of waveguides.

Because both the variable attenuator 114 and the gain-level equalizer 117 exist for every optical switch device 113, as shown in FIG. 16, it would result in an increased size of the whole system.

SUMMARY OF THE INVENTION

With the foregoing problems in view, it is a first object of the present invention to provide an optical exchange, for a wavelength division multiplexed (WDM) network, which can be reduced in both size and production cost as it does not require any variable optical attenuator and a gain equalizer on the input and output sides, and also can realize switching of optical signals without impairing SNR in a wide range of wavelengths.

A second object of the invention is to provide an optical exchange method for a wavelength division multiplexed (WDM) network, which can realize switching of optical signals without impairing SNR in a wide range of wavelengths and does not require any variable optical attenuator and a gain equalizer on the input and output sides of the optical exchange.

According to on generic feature of the invention, the first object is accomplished by an optical exchange for a wavelength division multiplexed (WDM) network, comprising: a plurality of input ports from which a plurality of optical signals of different wavelengths are to be input; a plurality of output ports to be allocated one to each of the plural input ports; means for deflecting the plural optical signals, which are input via the plural input ports, and outputting the deflected optical signals to the plural output ports; means for storing deflection information about a plurality of target amounts of deflection to which the respective input optical signals are to be individually deflected by the deflecting means, one target amount for each of the output ports, which are to be allocated to the respective input ports; and means for controlling/driving the deflecting means so as to set amounts of deflection of the individual input optical signals based on the deflection information stored in the storing means; the controlling/driving means including a switching controller, responsive to receipt of a switching control signal designating an output port as a destination of switching with respect to a particular input port as an object of switching, for reading out from the storing means the target amount of deflection for such destination-of-switching output port with respect to such object-of-switching port, and controlling the deflecting means in such a manner that the deflecting means deflects the individual input optical signals based on the respective target amounts of deflection that are read out from the storing means, and a power-level controller for performing a feedback control adjusting a power level of the individual output optical signal, which is received from the deflecting means via the designated output port, to a target power level.

As a specific feature, the controlling/driving means may further include a coupler for branching the individual optical signal, which is output from each output port, into a plurality of optical signal components, a monitor for monitoring the branched optical signal components, a driving circuit for driving the deflecting means so as to deflect traveling paths of the individual optical signals respectively to the selected destination-of-output ports, and a driving-circuit controlling circuit for controlling the driving circuit, based on the deflection information stored in the storing means, so as to adjust the amount of deflection of the individual optical signal to be switched to the selected destination-of-output port; and the feedback control by the power-level controller is such that the individual optical signal assumes the target power level based on the plural optical signal components monitored by the monitor.

As another specific feature, the feedback adjustment by the power-level controller may be such that the lowest one among power levels of the plural optical signals to be output is detected, and that the remaining power levels are equalized to the detected lowest power level.

As another specific feature, the power-level controller may obtain wavelength characteristics of an external optical device, which is communicably connectable with the output ports, and may perform the feedback adjustment such that the individual power levels of the respective optical signal components monitored by the monitor are attenuated accordance with the obtained wavelength characteristics of the external optical device.

As another specific feature, the storing means may serve to hold the wavelength characteristics of the external device; and the power-level controller performs the feedback adjustment based on the wavelength characteristics held by the storing means.

The external optical device may be an optical amplifier.

As another specific feature, the switching controller may be operable to make a fine adjustment, which is necessary for practical deflection after completion of the deflection by the stored target amounts, based on the monitored actual power levels.

The deflecting means may include: an input collimator array for collimating the individual optical signals input from the output ports; a first mirror array composed of a plurality of first tilt mirrors, which are arranged in a plane and are as many as the output ports, each of the first tilt mirrors serving to reflect the individual collimated optical signal; a second mirror array composed a plurality of second tilt mirrors, which are arranged in a plane and are as many as the output ports, each of the second tilt mirrors serving to reflect the individual optical signal that has been reflected by a current associated one of the first tilt mirror; and an output collimator array for collimating the resultant individual optical signals reflected by the second tilt mirrors and then outputting the last-named collimated optical signals to the output ports.

As another specific feature, the deflecting means may include a planar switch for selectively outputting the individual input optical signals to the destination-of-output ports, the planar switch having: a plurality of first optical-deflection elements, arranged in a row, for individually deflecting the individual optical signals input from the input ports; a plurality of second optical-deflection elements, arranged in a row parallel to the row of the plural first optical-deflection elements in a common plane, for individually deflecting the resultant individual optical signals deflected by the first deflection elements and then outputting the last-named deflected optical signals to the destination-of-output ports.

According to a further generic feature of the invention, the second object accomplished by an optical exchange method for a wavelength division multiplexed (WDM) network, comprising the steps of: providing an optical exchange having a plurality of input ports and a plurality of output ports to be allocated one to each of the plural input ports; inputting a plurality of optical signals of different wavelengths to the exchange via the plural input ports, respectively; deflecting the individual optical signals, which are input via the plural input ports, and outputting the deflected plural optical signals to the plural output ports; obtaining deflection information about a plurality of target amounts of deflection to which the respective input optical signals are to be individually deflected by the deflecting step, one target amount for each of the output ports, which are allocated to the respective input ports; and controlling the deflecting step so as to set amounts of deflection of the individual input optical signals based on the deflection information obtained by the obtaining step; the controlling step including, upon receipt of a switching control signal designating an output port as a destination of switching with respect to a particular input port as an object of switching, at the provided optical exchange, reading out from the deflection information, which is obtained by the obtaining step, the target amounts of deflection for such destination-of-switching output port with respect to each object-of-switching port, and controlling the deflecting step in such a manner that the individual input optical signals are deflected input optical signals are deflected based on the respective target amounts of deflection that are read out by the reading step; and performing a feedback control adjusting a power level of the individual output optical signal, which is the signal as the result of the deflecting step and is obtained via the designated output port, to a target power level.

As a specific feature, the controlling step may include the sub-steps of: detecting the lowest one among power levels of the plural optical signals by monitoring all the individual optical signals and comparing the monitored optical signals with one another in power level; and attenuating the remaining power levels to the detected lowest power level, so as to equalize all the individual power levels, by performing the feedback control, which controls each of the deflect amounts of the individual optical signals.

As another specific feature, the optical exchange method may further comprise the step of storing, in a storage device, gain-attenuation information about a plurality of amounts of target gain-attenuation by which the power levels of the individual optical signals are to be respectively attenuated based on wavelength characteristics of a gain at an external optical device which is communicatively connectable with the output ports, the controlling step further including the sub-steps of detecting the lowest one among power levels of the plural optical signals by monitoring the individual optical signals and comparing the monitored power signals with one another in power level, attenuating the remaining power levels to the detected lowest power level, reading out from the storage device the target-gain-attenuation information, and further attenuating the attenuated power levels, which are those as the result of the attenuating step, based on the read target-gain-attenuation information, so as to equalize the individual power levels of the gain at the external optical device, by performing the feedback control, which controls each of the deflect amounts of the individual optical signals.

As another specific feature, the controlling step may include the sub-steps of: monitoring the respective power levels of the individual optical signals; calculating a plurality of target amounts of gain attenuation by which the power levels of the individual optical signals are to be respectively attenuated based on both the monitored optical power levels and wavelength characteristics of a gain of an external optical device which is communicatively connectable with the output ports and attenuating the individual power levels of the optical signals to the respective calculated target amounts by performing the feedback control, which controls each of the deflect amounts of the individual optical signals.

As another specific feature, the controlling step may further include the sub-step of setting a minimum threshold value for the power levels to be compared in the detecting sub-step.

Following are advantageous results with the optical exchange and method according to the present invention:

Partly because the controlling/driving means controls the optical coupling efficiency in the optical exchange, and partly because the controlling/driving means equalize the power levels of the optical signals in terms of wavelengths without using any variable attenuator, it is unnecessary to consider either the wavelength dependence or the polarization dependence of the variable attenuator, realizing flexible designing of the optical exchange.

Partly because the individual power levels of the optical signals output from the optical amplifier can be equalized in terms of wavelengths without using any gain equalizer, which has a characteristic of wavelength dependence, on the output side of the optical amplifier, it is unnecessary to consider the characteristics of optical filters, which constitute a gain equalizer, thus equalizing the power levels of optical signals with high accuracy. It is therefore possible to minimize either narrowing of band-width or impairing of SNR, thus preventing signal transmission quality from lowering.

Because the variable attenuator and the gain equalizer, which were used on the output side of the deflecting means acting as an optical switch in the conventional OXC or OADM system for WDM network, it is possible to decrease the total number of elements of the optical exchange and to reduce the price of the optical exchange remarkably.

BRIEF DESCRIPTION OF THE DRAWINGS

FIG. 3 is a table showing a database of target amounts of deflection for allocation of input ports to output ports in the optical switch device of the one embodiment;

FIG. 5 is a table showing a database of wavelength-gain characteristics;

FIG. 18 is a detailed diagram, with characteristic graphs (a), (b) and (c), illustrating a problem encountered with the conventional optical switch of FIG. 15.

DESCRIPTION OF THE PREFERRED EMBODIMENT(S)

One embodiment of the present invention will now be described with reference to the accompanying drawings.

Figure 16:
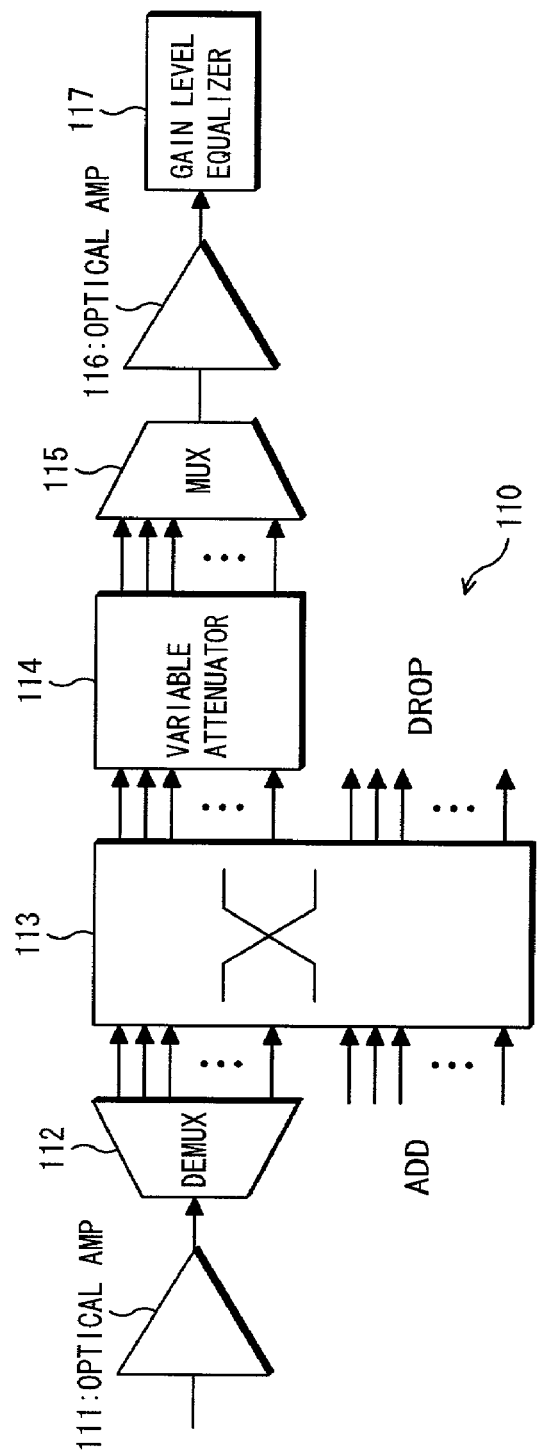
FIG. 16 is a block diagram showing an individual optical switch used in the conventional OXC system of FIG. 14 or the conventional OADM system of FIG. 15.
Figure 17:
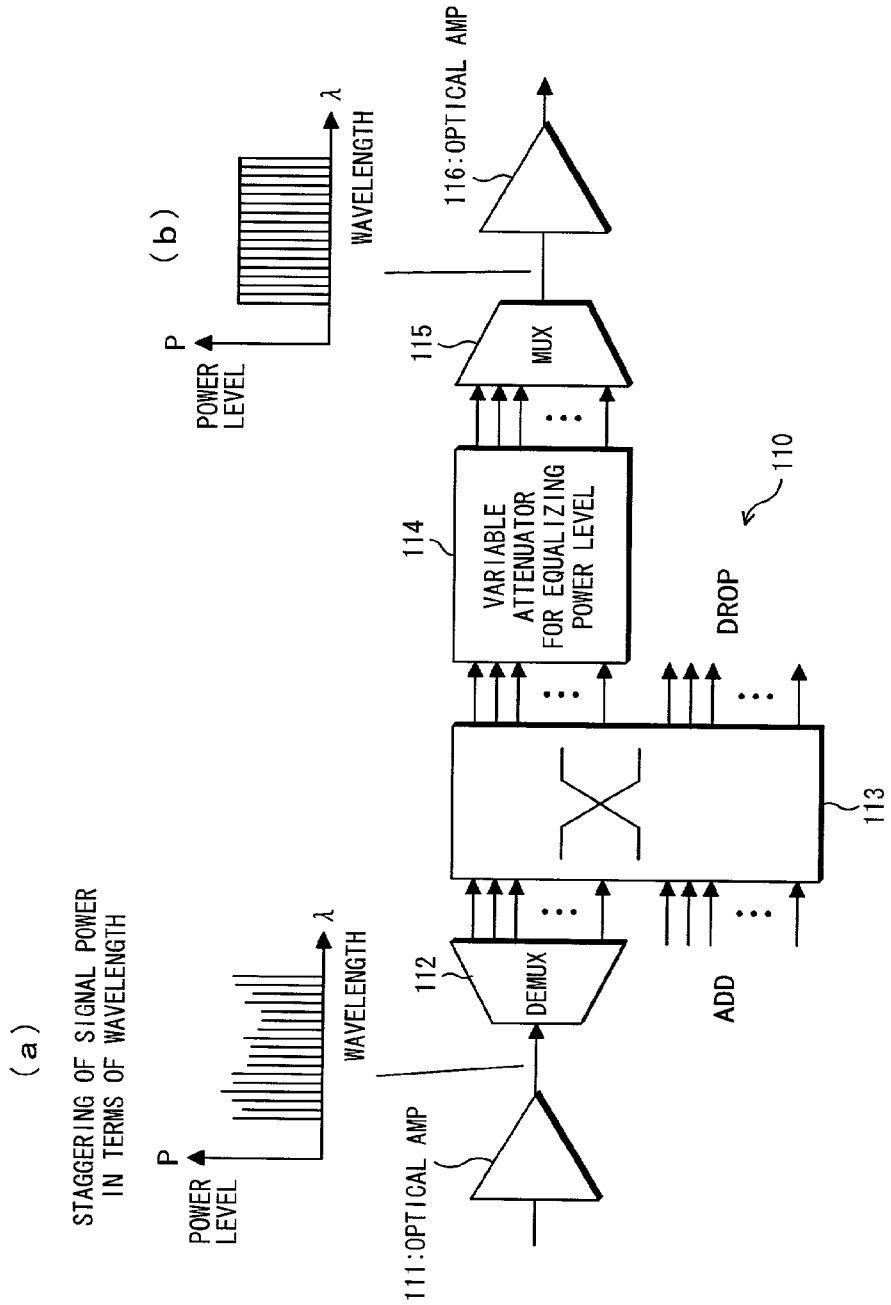
FIG. 17 is a detailed diagram, with characteristic graphs (a) and (b), illustrating a problem encountered with the conventional optical switch of FIG. 15.

(1) Construction of Optical Exchange:

An optical exchange according to the one embodiment of the present invention is an improvement of the conventional optical switch device 113 of the conventional optical switch 110 shown in FIG. 16. The optical exchange of the present embodiment serves as a novel optical switch that has a double function of both the variable attenuator 114 and the gain equalizer 117 of the conventional optical switch 110.

Figure 1:
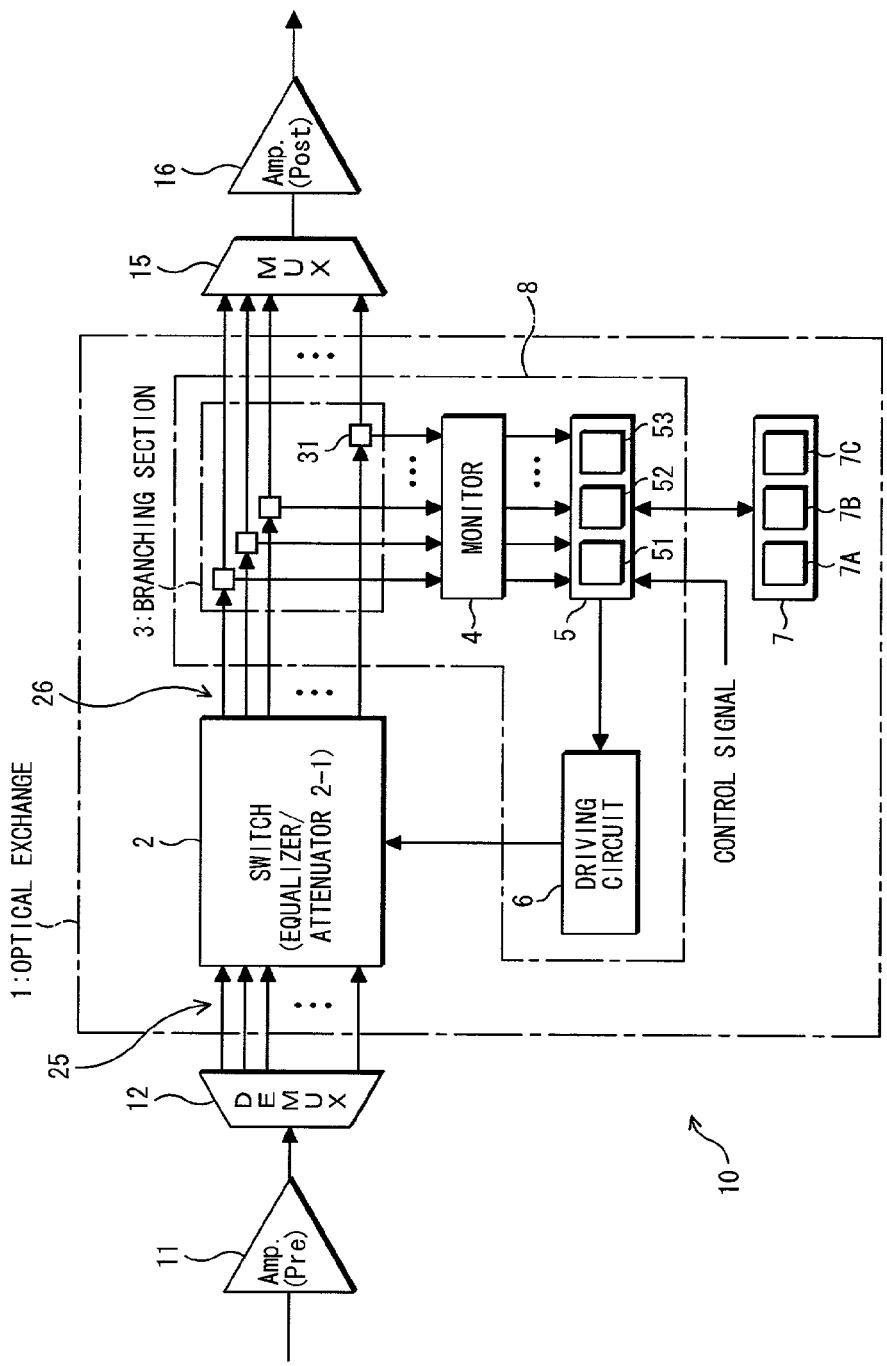
FIG. 1 is a block diagram showing an optical exchange according to one embodiment of the present invention.

FIG. 1 is a block diagram showing an optical switch 10 equipped with the optical exchange 1 of the present embodiment. The optical switch 10 comprises a first optical amplifier 11, a demultiplexer 12, a multiplexer 15, and a second optical amplifier 16; these elements respectively have the same functions as the first optical amplifier 111, the optical coupler 112, the optical multiplexer 115, and the second optical amplifier 116 which are described above as elements of the conventional optical switch 110 in connection with FIG. 16 (Related Art).

The optical exchange 1 performs switching each operation on the individual input optical signal for each channel. The optical exchange 1 comprises a switch device 2, an branching section 3, an optical monitor 4, a driving-circuit control circuit 5, a driving circuit 6, and a memory 7. The branching section 3, the optical monitor 4, the driving-circuit control circuit 5 and the driving circuit 6 jointly serves as a switch controlling/driving section 8 that controls/drives the switch device 2 so as to set a deflection state (or a mirror angle described later) of the individual optical signal in the switch device 2 based on deflection information stored in the memory 7. The deflection information represents a target amount of deflection by which the individual optical signal is to be deflected by the switch device 2.

The switch device 2 receives a plurality of optical signals, which have been demultiplexed in terms of channels by the demultiplexer 12 and input via a plurality of input ports 25. Then the switch device 2 deflects the individual optical signals of different wavelengths and outputs the deflected optical signals as switched optical signals one to a respective output port allocated to each of the input ports. Specifically, the switch device 2 is in the form of, for example, an optical system in which MEMS (Micro Electric Mechanical System) of FIG. 2 is incorporated.

Figure 2:
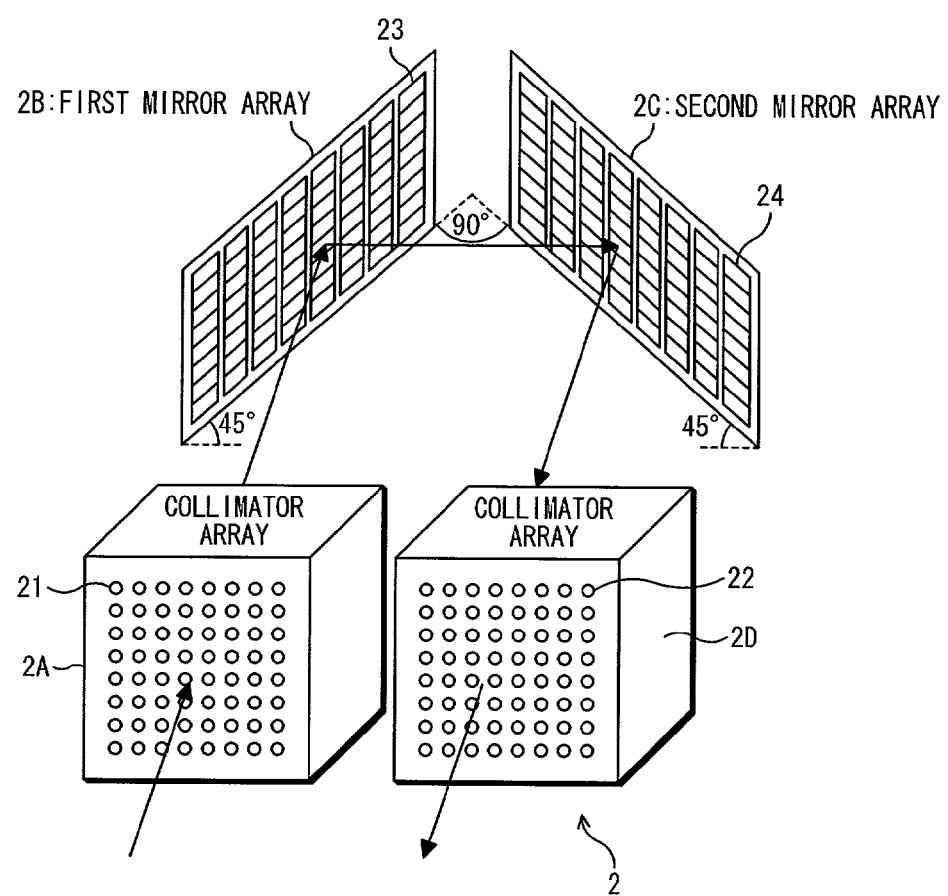
FIG. 2 is a detailed perspective view showing an optical switch device of the one embodiment.

The switch device 2 of FIG. 2 is composed of an input collimator array 2A, a first mirror array 2B, a second mirror array 2C, and an output collimator array 2D. The input collimator array 2A has N (N is an integer greater than 1) collimators 21 that are arranged in a matrix and each serve as an input port to receive each of the input optical signals of N channels. The first and second mirror arrays 2B, 2C deflect (reflect) input optical signals of N channels received from the input collimator array 2A. The output collimator array 2D has N collimators 22 that are arranged in a matrix and each serve as an output port to receive the deflected (reflected) optical signals.

The input and output collimators 21, 22, respectively having the input collimator array 2A and the output collimator array 2D, are connected to optical fibers 25, 26, respectively. The optical signals from the demultiplexer 12 are input to the input collimator 21 through the corresponding optical fibers 25, and the deflected optical signals are then output from the output collimator 22 to the multiplexer 15 through the corresponding optical fibers 26.

Each of the first mirror array 2B and the second mirror array 2C is composed of N tilt mirrors 23 or 24 arranged in a matrix. The tilt mirrors 23, 24 are individually adjustable in angle as driven by the driving circuit 6. In the present embodiment, the input collimator array 2A and the output collimator array 2D are disposed parallel to each other, and the first mirror array 2B and the second mirror array 2C are disposed perpendicularly to each other. Further, the input collimator array 2A and the first mirror array 2B are disposed at an angle of 45 degrees, and the output collimator array 2D and the second mirror array 2C are disposed at an angle of 45 degrees.

By this arrangement, the individual optical signal is input through one of the input collimators (input ports) 21 in the input collimator array 2A, and are then reflected by the corresponding tilt mirror 23 on the first mirror array 2B and then a designated one tilt mirror 24 on the second mirror array 2C as the respective tilt mirrors 23, 24 are adjusted in angle, thereby being directed to a designated one output collimator (output port) 22 in the output collimator array 2B. And the individual optical signal is then output from the designated one output collimator 22 as switched optical signal.

The memory 7 (storing means) stores a deflection-information table 7A containing deflection information about a plurality of target amount of deflection (target amounts of driving) by which the individual optical signals are to be deflected, as shown in FIG. 3, one target amount for each of the output ports (output channels), which are the output collimators 22 to be allocated to the respective input collimators 21 (input channels). The deflection-information table 7A of the memory 7 contains angle information about a plurality of target tilt angles of the tilt mirrors 23, 24 to be adjusted, one tilt mirror at a position to reflect the input optical signal to be switched, in such a manner that the output optical signal is output from the output collimator 22 allocated to the input collimator 21.

Further, the memory 7 also stores an initial-setting table, which contains a plurality of amounts of deflection by which the individual tilt mirrors 23, 24 are to be controlled/driven from the respective initial angular positions.

The branching section 3 is composed of a plurality of individual optical couplers 31. The individual coupler 31 branches a respective optical signal, which is transmitted through an optical fiber 26 connected to the respective output port of the switch device 2. Namely, the optical couplers 31 are mounted one on each of the individual optical fibers 26. While the main optical signal continues traveling in the fiber 26 as an output optical signal, the branched optical signal is outputted to the optical monitor 4 as a feedback-control signal.

The optical monitor 4 monitors the optical signals branched by the respective couplers 31. The optical monitor 4 includes a plurality of photodiodes each for outputting an electrical signal, such as a photo current or electrical current, corresponding to the power level of the branched individual optical signal. The optical monitor 4 further includes a electric current/voltage converter for converting a photocurrent into a voltage signal.

The driving circuit 6 receives a digital-control signal from a later-described driving-circuit control circuit 5, and converts the received digital-control signal into an analog-control signal, whereupon the driving circuit 6 angularly moves the object tilt mirror 23 on the first mirror array 2B and the object tilt mirror 24 on the second mirror array 2C to vary the tilt angles based on the converted analog-control signal, so that the respective object optical signals are deflected individually in the switch device 2. Thus the driving circuit 6 may be in the form of an actuator to change the state of deflection of the object input optical signal.

The driving-circuit control circuit 5 controls the driving circuit 6 so as to set an angle of deflection of the individual optical signal in the switch device 2 based on the result of monitoring by the optical monitor 4 and the deflection-information table 7A stored in the memory 7. The driving-circuit control circuit 5 may be in the form of an application specific integrated circuit (ASIC), such as a field programmable gate array (FPGA). The driving-circuit control circuit 5 serves also as both a switching controller 51 and a power-level controller 52, which are significant features of the present invention. Further, when the optical exchange 1 is in an initial state, the driving-circuit control circuit 5 serves also as an initial controller 53 to control the driving circuit 6 based on the amounts of angular movement of the object tilt mirrors 23, 24 are registered in the initial-setting table.

The switching controller 51, responsive to receipt of a switching control signal designating an output port as the destination of switching with respect to particular input port, reads out from the memory 7 the target amount of deflection for the destination-of-switching output port with respect to the object-of-switching port and controls the switch device 2 in such a manner that the individual input optical signals are deflected based on the respective target amounts of deflection that are read out from the memory 7.

Namely, the switching controller 51 reads out from the memory 7 the driving amount for adjustment of angles of the object tilt mirrors 23, 24, and controls the driving circuit 6 so as to adjust the angles of the mirrors 23, 24 based on the read-out driving amount.

And the power-level controller 52 performs the feedback control adjusting the power level of the output optical signal, which is received via the designated output port of the output collimator 22, to a predetermined target power level based on monitoring information obtained as the result of monitoring by the optical monitor 4. In this embodiment, the feedback control is selectable from following three types of control modes so as to equalize the power levels of the optical signals as described below.

1. A first-control mode: the lowest one among the power levels of the plural optical signals to be output is detected by comparing all the individual optical signals, and the remaining power levels are equalized to the detected lowest power level by the switch 2.

2. A second-control mode: the lowest one among the power levels of the plural optical signals to be output is detected by comparing each of the optical signals, and the remaining power levels are equalized to the detected lowest power level by the switch device 2. Further, wavelength characteristics of an external device, which is the optical amplifier 16 in this embodiment, is obtained, and then the equalized power levels of the optical signals are superimposed over the obtained characteristics of the external device so as to equalize the power levels of the resulting optical signals to be output from the external device.

3. A third-control mode: the wavelength characteristics of the external device are obtained, and power levels of the respective optical signals to be output from the external device and to be attenuated are calculated to thereby obtain equalizing information, whereupon the individual optical signals to be output from the external device are equalized by a feedback control.

Consequently, the switch device 2 serves also as an equalizer/attenuator unit 2-1 that attenuates/equalizes the output optical signals by driving the tilt mirrors 23, 24 by the driving circuit 6 as controlled by the power-level controller 52.

Figure 4:
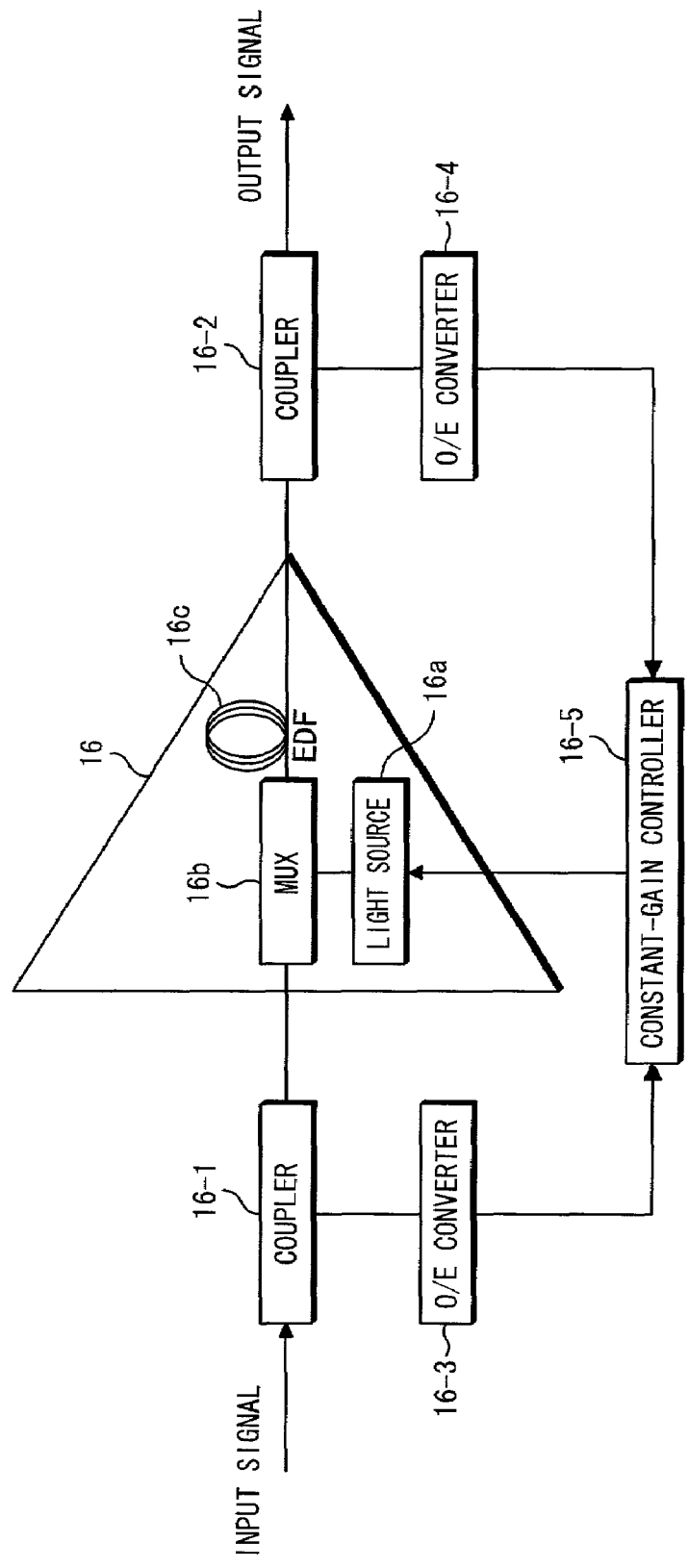
FIG. 4 is a block diagram showing an optical amplifier which is to be controlled so as to obtain a constant gain.

The second optical amplifier 16, as shown in FIG. 4, outputs the amplified input signal by propagating the optical signal, which is multiplexed with pump light from a pump light source 16a by an optical coupler 16b, through an erbium doped fiber (EDF) 16c. Further, the second optical amplifier 16 is controlled by a constant-gain controller 16-5 in such a manner that the gain level of the output signal from the second optical amplifier 16 is constant. The couplers 16-1, 16-2, the O/E converters 16-3, 16-4, and the constant-gain controller 16-5 (all appearing in FIG. 4) are omitted here in FIG. 1 for clarity of explanation.

Namely the couplers 16-1, 16-2 branches the optical signal to be input to the second optical amplifier 16 and the optical signal to be output from the second optical amplifier 16, respectively, and then the individual O/E converters 16-3, 16-4 converts the branched optical signals to electrical signals, whereupon the constant-gain controller 16-5 controls the pump light source 16a based on the electrical signals from the O/E converters 16-3, 16-4 in such a manner that the amplified optical signal to be output is equal to the power level of input optical signal.

The wavelength-gain characteristic of the amplifier 16 can be constant as population inversion of the erbium doped fiber 16c is constant. Namely, because the distribution inversion is a function of the power level of input optical signal, the power level of pump light from the light source 16a and length of the erbium doped fiber 16c, it is possible to calculate the population inversion under a predetermined gain-constant control with the length of erbium doped fiber 16c fixed. Therefore the wavelength-gain characteristic of the amplifier 16 can be stored previously.

In the second-control mode and the third-control mode, the equalizing/attenuating control is carried out based on the wavelength-gain characteristic of the second optical amplifier 16. This wavelength-gain characteristic of the amplifier 16 may be stored in the memory 7 as a wavelength-gain table 7C of FIG. 5 in terms of the gain G of the second optical amplifier 16.

The wavelength-gain table 7C of FIG. 5 contains a plurality of individual gain values g11 through gn1, g12 through gn2, . . . g1m through gnm with respect to the respective channels (ports) #1 through #N, which correspond to the individual wavelengths λ1 through λn (n=N), in accordance with estimated gain G1, G2 . . . Gm of the gain-constant controller 16-5 of the second optical amplifier 16.

Here, the power-level controller 52 reads out from the memory 7 information about the wavelength-characteristic of the second optical amplifier 16 and then performs the feedback control in the second-control mode or the third-control mode so that the power-level control can be accomplished based on the obtained wavelength-characteristic information with virtually real time.

Figure 6:
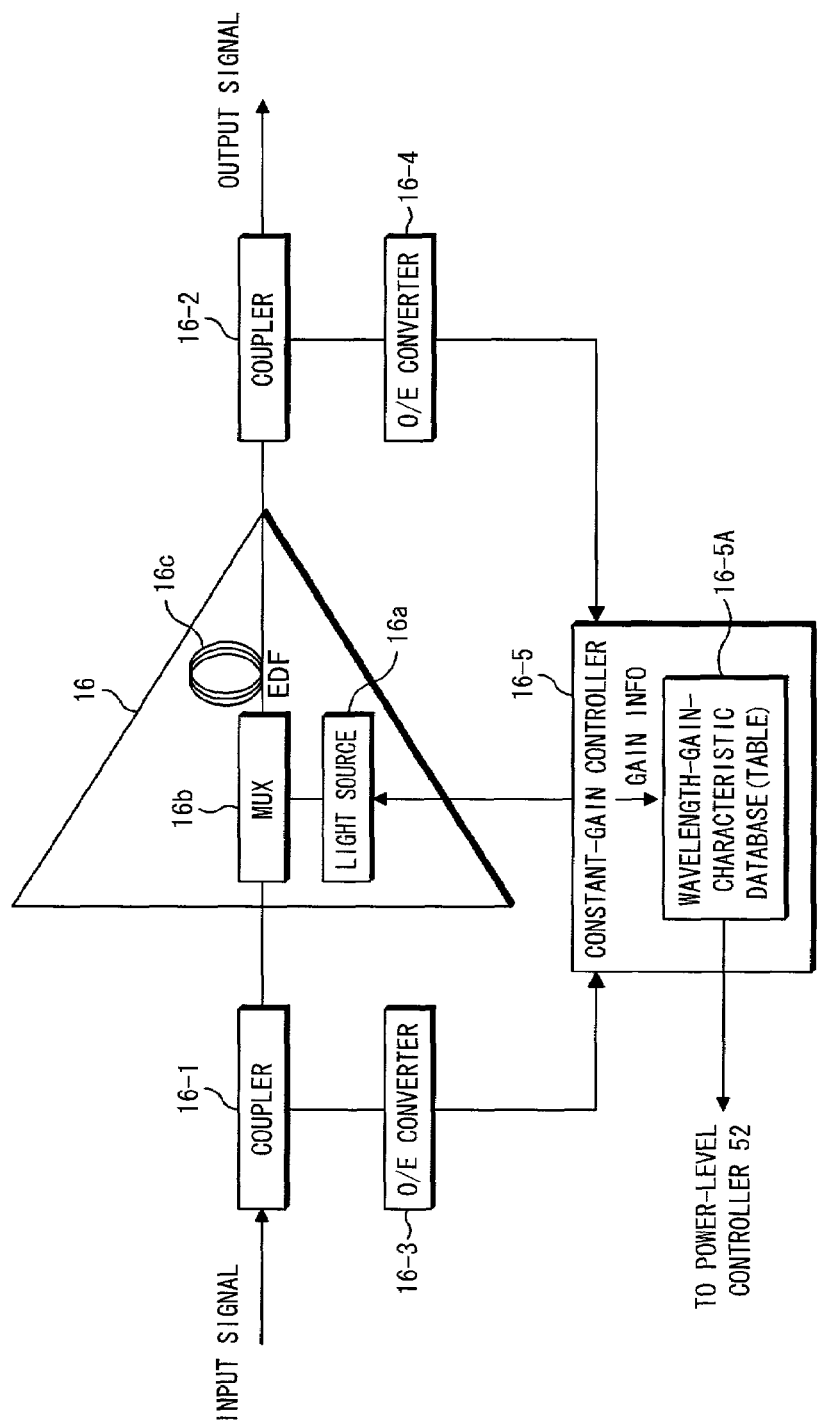
FIG. 6 is a block diagram showing a modified optical amplifier.

Alternatively, this wavelength-gain characteristic information may be input to the power-level controller 52 of the power-level control circuit 5 from an external source (the wavelength-gain characteristic table 16-5A in the gain-constant controller 16-5, which performs a gain-constant control on the second optical amplifier 16), outside the optical exchange, other than the memory 7, as shown in FIG. 6.

(2) Control by Driving-Circuit Control Circuit:

In the thus constructed optical exchange 1, the individual optical signals of the respective channels input from the input collimator 21, and are deflected by the object tilt mirrors 23, 24, whose angles are adjusted by the driving circuit 6, whereupon the individual optical signals are output through the respective output ports, which are individually allocated by the deflection, of the output collimator 22.

Figure 7:
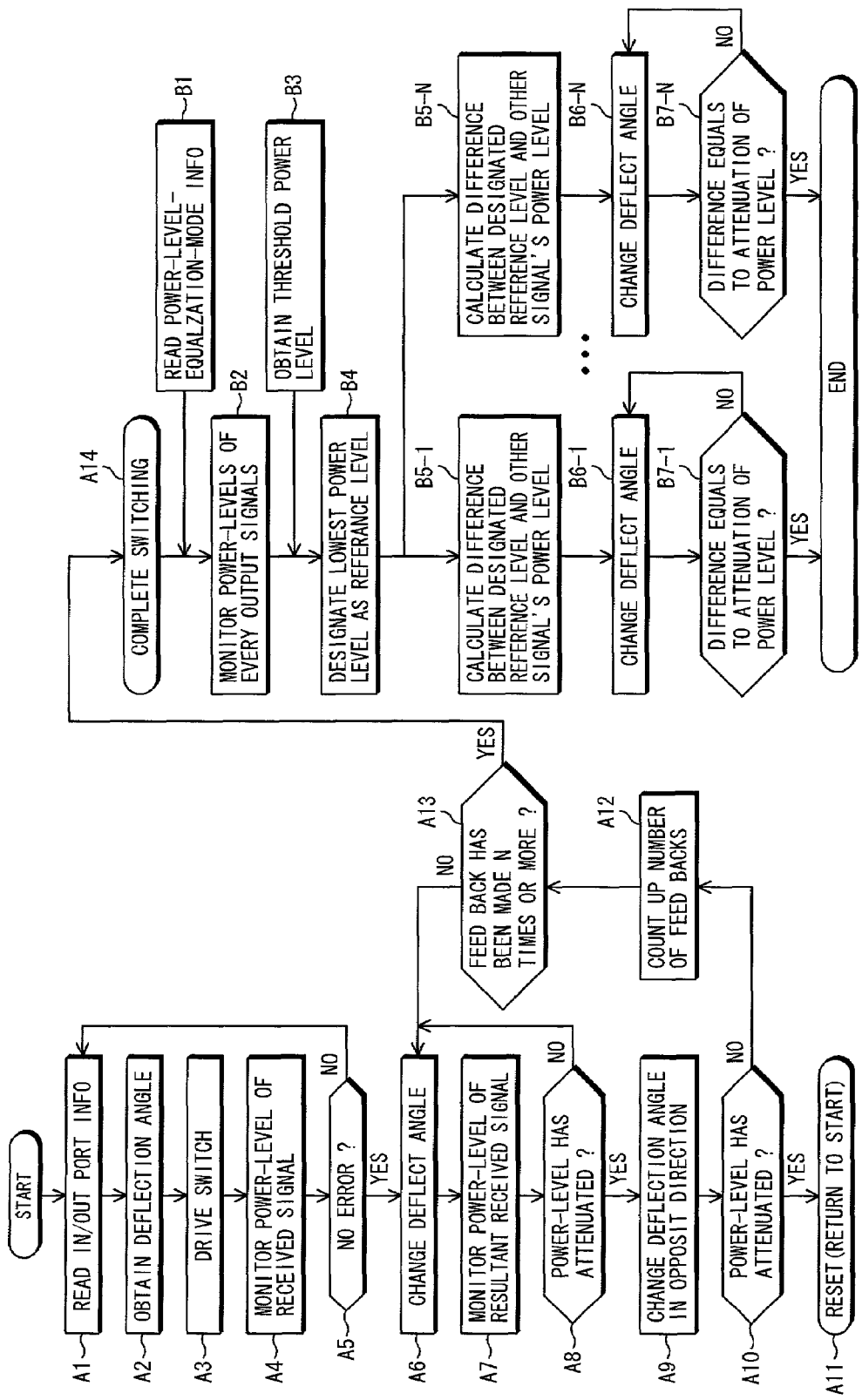
FIG. 7 is a flowchart showing the manner in which a switching controller and a power-level controller operate in a first control mode.
Figure 8:
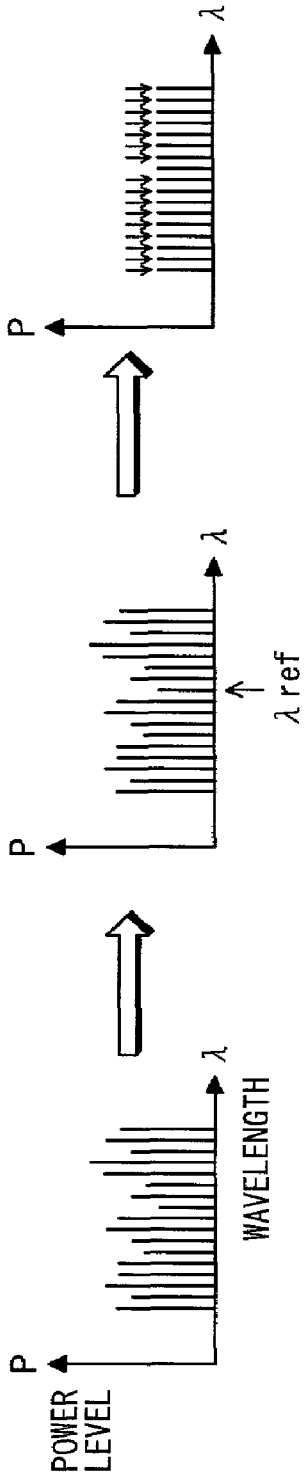
FIGS. 8(a) through 8(c) are characteristic graphs illustrating the first control mode of the power-level controller.
Figure 9:
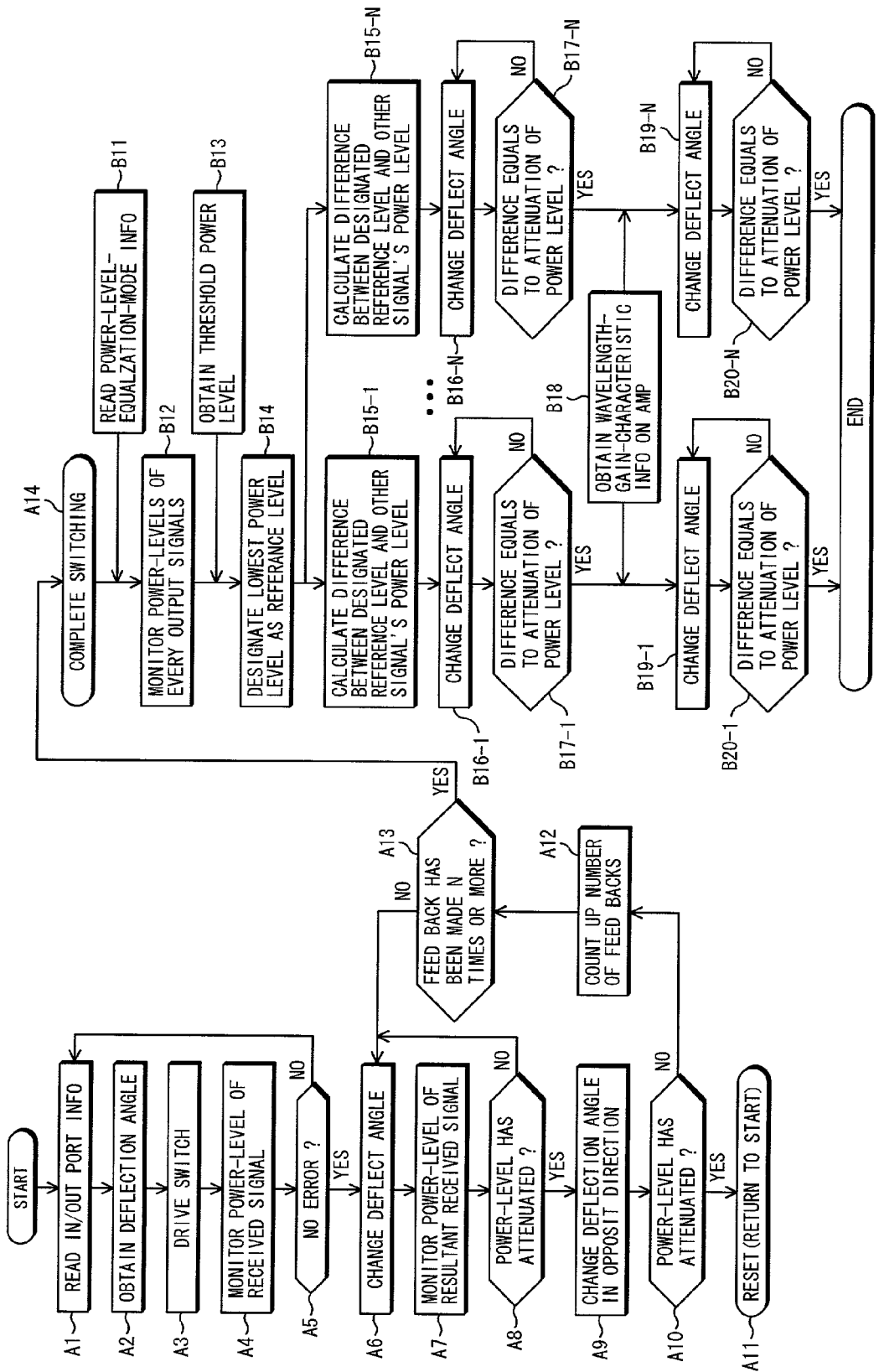
FIG. 9 is a flowchart showing the manner in which the switching controller and the power-level controller operate in a second control mode.
Figure 10:
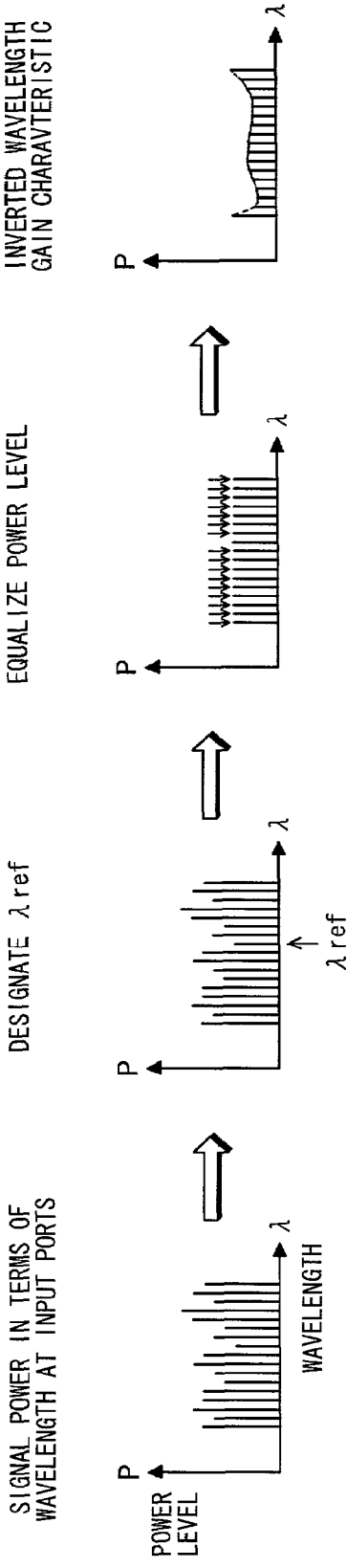
FIGS. 10(a) through 10(d) are characteristic graphs illustrating the second control mode of the power-level controller.
Figure 11:
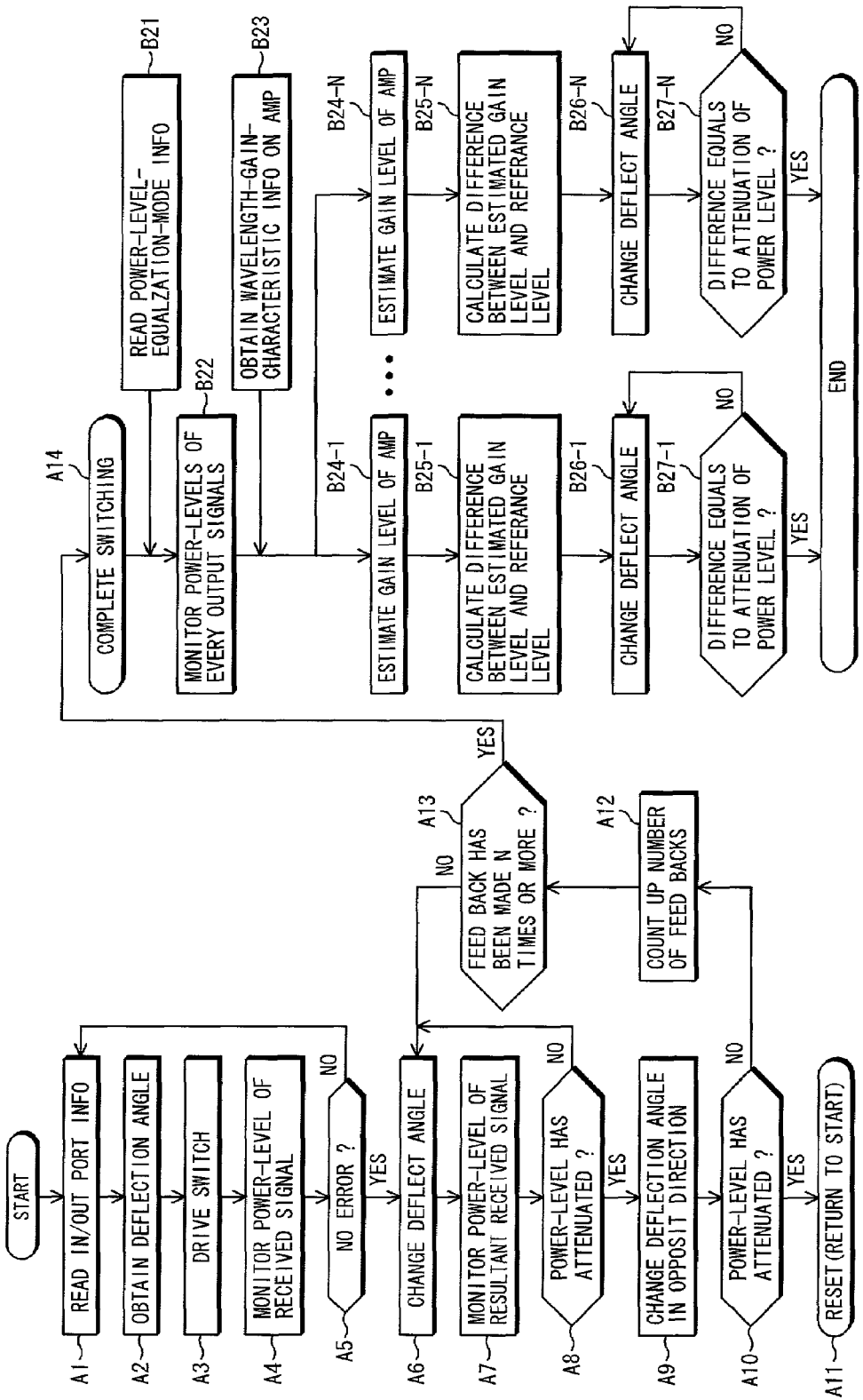
FIG. 11 is a flowchart showing the manner in which both the switching controller and the power-level controller operate in a third control mode.
Figure 12:
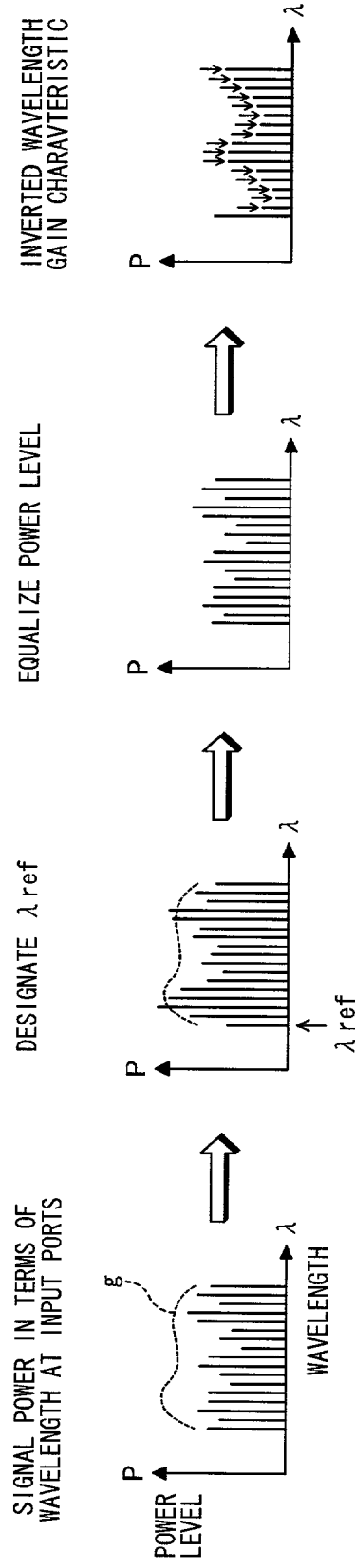
FIGS. 12(a) through 12(d) are characteristic graphs illustrating the third control mode of the power-level controller.

A switching control and a feedback control will now be described with reference to FIG. 7 through FIG. 12. The switching control is performed, upon receipt of request for switching the allocation between the object-of-switching input port and the destination-of-switching output port, by the switching controller 51, and the feedback control is performed upon completion of the switching control by the switching controller (2-1) Switching Control by Switching Controller:

Description begins with the switching control at the optical exchange 1 using the flowchart (steps A1 through A14) of the FIG. 7 (FIGS. 9 and 11).

Upon receipt of the request for switching the channel, the switching controller 51 accesses the deflection-amount table 7A, which is stored in the memory 7, to read channel information (input channel information about the input port, and output channel information about the output port) (step A1). Then the switching controller 51 adjusts the angles of the tilt mirrors 23, 24 of the switch device 2 (deflecting means) based on the obtained channel information (switching control step: steps A2, A3).

The power level of every switched optical signal is monitored by the monitor 4; if no abnormality is found with the monitored power level, then a fine adjustment (so-called calibration) is made so as to output the optical signal in an optimum power level (steps A6 through A14). Specifically, the switching controller 51 makes the fine adjustment such that changing the deflection angle stepwise, which is obtained from the deflection-information table 7A, based on the power level monitored by the monitor 4.

More specifically, the switching controller 51 controls the driving circuit 6 to change the individual deflection angles of the object tilt mirrors 23, 24 (step A6), and then the monitor 4 monitors the resultant power level of the optical signal whose deflection angle has been changed (step A7) Whereupon the switching controller 51 compares the power levels between before and after the changing of deflection angle; if the power level has increased, then the same procedure is repeated (from NO route of step A8 to step A6).

Otherwise if the power level is attenuated, the switching controller 51 judges that the deflection angle has already passed an optimum point (power maximum point), and then changes the deflection angle in opposite direction by a constant extent (from YES route of step A8 to step A9). Whereupon the switching controller 51 discriminates whether or not the power level is further attenuated after the change of deflection angle in opposite direction (step A10), and if the result of discrimination is positive, then the procedure returns to step A1 to restart as it is presumed that any error has occurred (from YES route of step A10 to step A11).

Otherwise if the result of discrimination in step A10 is negative, then the fine adjustment of deflection angle is repeated N times (step A12, from NO route of step A13 to step A6) steps from A6 through A10. In next step A12, which comes from NO route of step A10, count-up takes place as to how many times the fine adjustment is repeated. If the deflect-angle-feedback control is repeated N times or more in step A13, then the procedure goes to step A14 to complete the switching because it is presumed that an approximate optimum angle is found by the N-times feedback control. And the procedure goes to next stage of steps to equalize the power levels of the optical signal by the power-level controller 52.

(2-2) Control by Power Level Controller:

Meanwhile, the power-level controller 52 performs the feedback control on the individual power levels of the optical signal, which is output from the individual output ports of the output collimator 22, upon completion of the switching by the switching controller 51 responsive to the switching request, obtaining the respective target power levels. And the feedback control takes place by controlling the object tilt mirrors 23, 24 of the switch device 2 in the following three control modes.

(2-2-1) First Control Mode by Power-Level Controller:

The first control mode of the feedback control will be described using FIG. 7 (steps B1 through B7) and FIGS. 8A through 8C.

Steps B5-1 through B5-N, B6-1 through B6-N, and B7-1 through B7-N are alternatively represented as B5, B6, and B7, respectively, for clarity of description.

Upon completion of the switching control by the switching controller 51 (step A14), discrimination is made as to which control mode is designated (step B1). If the first control mode is designated, the power levels of the output optical signal from the individual output ports of the output collimator 22 are monitored and compared one another.

Specifically the individual power levels of the optical signals of all channels, which are output from the respective output ports of the output collimator 22 after the switching control of the switching controller 51, are monitored by the monitor 4 (step B2). The result of monitoring by the monitor 4 is shown in FIG. 8(a).

Assuming that a threshold value is previously stored in a storage device such as the memory 7, the threshold value is obtained from the memory 7 and is then compared with every power level to find the channel whose power level is lower than the threshold value. This channel of lower-thanthreshold power level is excluded from the object channels whose power levels are to be equalized (step B3). Alternatively the procedure of this step A3 may be omitted.

If the channel λref of the lowest power level is designated, as a reference level, from the monitored power levels of the channels that are not than the threshold value (step B4, FIG. 8(b)), the power-level-equalizing control is performed using the lowest power level of the selected channel as a reference level. Specifically, a difference between the reference level and every other power level of each channel is calculated (step B5).

As an attenuation step, the feedback control is performed in such a manner that the individual power levels of optical signal output from the individual ports of the output collimator 22 are attenuated to the lowest power level designated as the reference level. Specifically, the angles of object tilt mirrors 23, 24 are varied based on the calculated difference of the individual power levels gradually until the accumulated attenuation amounts coincide with the difference (steps A6, A7) The power levels of the optical signal of each channel to be output from the optical exchange 1 are equalized to the lowest power level, which is designated as the reference level (step B7, FIG. 8(a)).

(2-2-2) Second Control Mode by Power-Level Controller:

The second control mode of the feedback control will now be described using the flowcharts of FIG. 9 (steps B11 through B20) and FIG. 10(a) through FIG. 10(d). Likewise the first control mode, steps B15-1 through B15-N, ..., B20-1 through B20-N are alternatively represented as B15, B20, respectively, in FIG. 9 for clarity of description.

Upon completion of the switching control by the switching controller 51 (step A14), discrimination is made as to which control mode is designated (step B11). If the second control mode is designated, the lowest power level CH is selected, as a reference level, likewise the first control mode (level comparison step, FIG. 10(b)). Then the power levels of the optical signal of each channel (FIG. 10(a)) are equalized to the selected lowest power level, which is selected as the reference level, (attenuating steps B12 through B17, FIG. 10(c)). The comparison with the threshold value may be omitted in step B13, which corresponds to step A3 of the first control mode.

Subsequently, the feedback control is made on the deflection angles (angles of the tilt mirrors 23, 24) by imparting the wavelength-gain characteristic, which is represented by attenuation-amount information (wavelength-gain characteristic information) stored in the memory 7, to the output optical signal levels attenuated in the attenuating step. Specifically, the power-level controller 52 has access to the table 7C (or 16A) stored in the memory 7 (or constant gain controller 16-5, FIG. 6) to read the wavelength-gain characteristic of the amplifier 16 (step B18). Further, the power-level controller 52 inverts the read wavelength-gain characteristic, and estimates the attenuation amounts of the power levels of each channel corresponding to the inverted characteristic. The attenuation amount of the gain level of each wavelength can be calculated by a calculation function of the power level controller 52.

Then the angles of the object tilt mirrors 23, 24 are varied in a direction so as to gradually attenuate the power levels of the optical signal for each channel until the accumulated attenuation amounts coincide with a difference (steps B19, B20) By this arrangement, equalization of the power levels of the optical signal output from the switch device 2 and equalization of gain power levels to cancel the wavelength-gain characteristic of the amplifier 16, which is connected to the optical exchange 1, are realized at the same time so that the power levels of every channel (wavelength) output from the amplifier 16 will be an even optical signal (FIG. 10(d)).

(2-2-3) Third Control Mode by Power Level Controller:

The third control mode of the feedback control will be described using the flowchart of FIG. 11 (steps B21 through B27) and FIGS. 12A through 12D. Likewise the first and second control modes, steps B24-1 through B24-N and B27-1 through B27-N are alternatively represented as B24 and B27, respectively.

Upon completion of the switching control by the switching controller 51 (step A14), discrimination is made as to which control mode is selected (step B21) If the third control mode is selected, the input power levels of all channels #1 through #N are monitored (step B22, FIG. 12(a)).

Subsequently, the attenuation amounts for attenuating gain power levels of the output signals output from the amplifier 16, which is disposed downstream of the output collimator 22, are calculated based both the monitored power levels of the individual output optical signals and the wavelength-gain characteristic of the amplifier (calculating step).

Specifically, the wavelength-gain characteristic of the amplifier 16, which is disposed downstream of the optical exchange 1, is read from the table 7C (or 16-5A) stored in the memory 7 (or the constant gain controller 16-5, FIG. 6) (step B23, g of FIG. 12(a)). Then the gain levels of the individual channels, which are output from the amplifier 16, are estimated from the monitored optical power levels and the wavelength-gain characteristic g (step B24, FIG. 12(b)). Then, the individual estimated power levels are compared with one another to designate the channel λref of the lowest power level (shown in FIG. 12B) as a reference level, and a difference between each of the estimated power levels other than the lowest one and the designated reference level (estimated lowest power level) of channel λref is calculated as equalization information.

Subsequently, the feedback adjustment is performed on the deflection angles of the object tilt mirrors 23, 24 so as to attenuate/equalize the gain power levels of the optical signals output from the amplifier 16 based on the calculated equalization information.

Specifically, the angles of the object tilt mirrors 23, 24 are varied in a direction to gradually attenuate the optical power levels until the accumulated attenuation amounts coincide with the difference for every channel (steps B26, B27). By this arrangement, equalization of the power levels of the optical signal outputs from the switch device 2 (FIG. 12(c)) and gain equalization to cancel the wavelength-gain characteristic of the amplifier 16, which is disposed downstream of the optical exchange 1, (FIG. 12(d)) can be realized at the same time.

(3) Results of this Embodiment:

As described above, according to the optical exchange of the present embodiment, because the optical coupling efficiency in the optical exchange can be controlled to equalize the optical power levels of each wavelength without using a variable attenuator, it is unnecessary to consider either the wavelength dependency or the polarization dependency of the variable attenuator, which have been conventional problems, guaranteeing flexible system designing for the optical exchange.

Further, because the individual gain levels of the respective optical signals output from the amplifier 16 can be equalized without using any gain equalizer, which should have disposed downstream of the amplifier 16 as an optical device having a wavelength-gain dependency in the conventional art, it is unnecessary to consider the characteristics of the individual optical filters of the gain equalizer so that the individual power levels can be equalized, thus reducing the bandwidth loss and the SNR loss to a minimum to suppress a lowered signal transfer quality.

Furthermore, because a variable attenuator and a gain equalizer, which should have disposed downstream of the switch device 2 in the conventional art, can be omitted, it is possible to reduce the number of essential parts and the price of the optical exchange, giving a significant contribution to WDM systems.

(4) Additional Features:

In the three control modes, as shown in FIGS. 7, 9 and 11, the power levels of the individual channels #1 through #N are equalized in parallel. Alternatively, successive equalizing controls may be performed in terms of individual channels or in terms of N/2 or less channels.

In the present embodiment, the switch device (deflecting means) 2 is in the form of an optical system that is composed of the input collimator array 2A, the first mirror array 2B, the second mirror array 2C, and the output collimator array 2D, as shown in FIG. 2. However, the present invention should by no means be limited to this illustrated example, and the switch device 2 may be an alternative optical system shown in FIG. 13.

Figure 13:
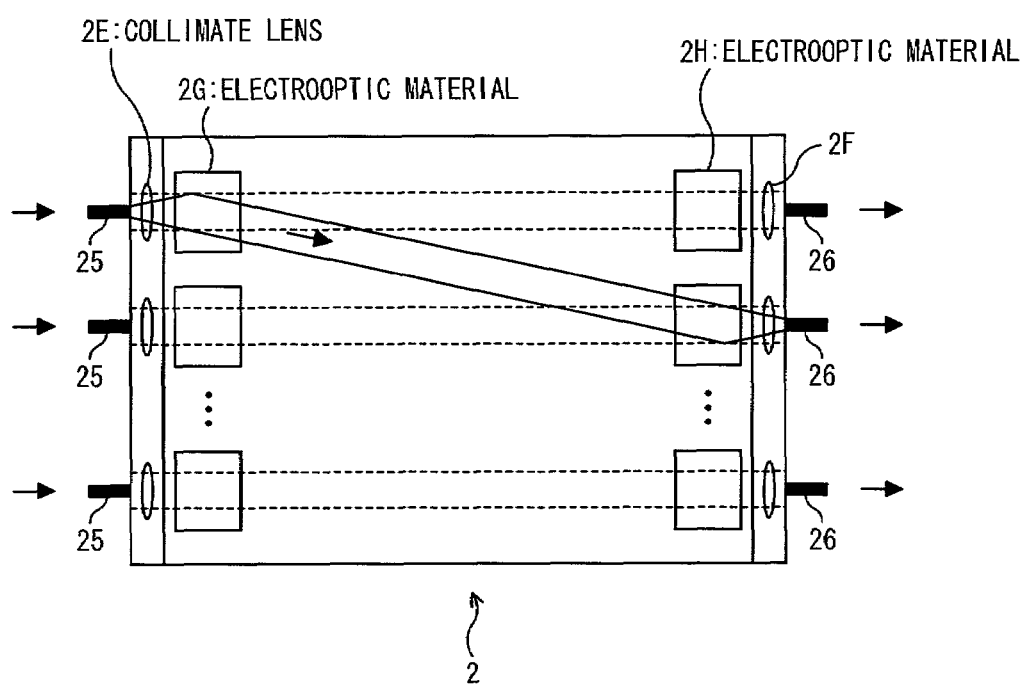
FIG. 13 is a detailed view showing an modified optical switch device.
Figure 14:
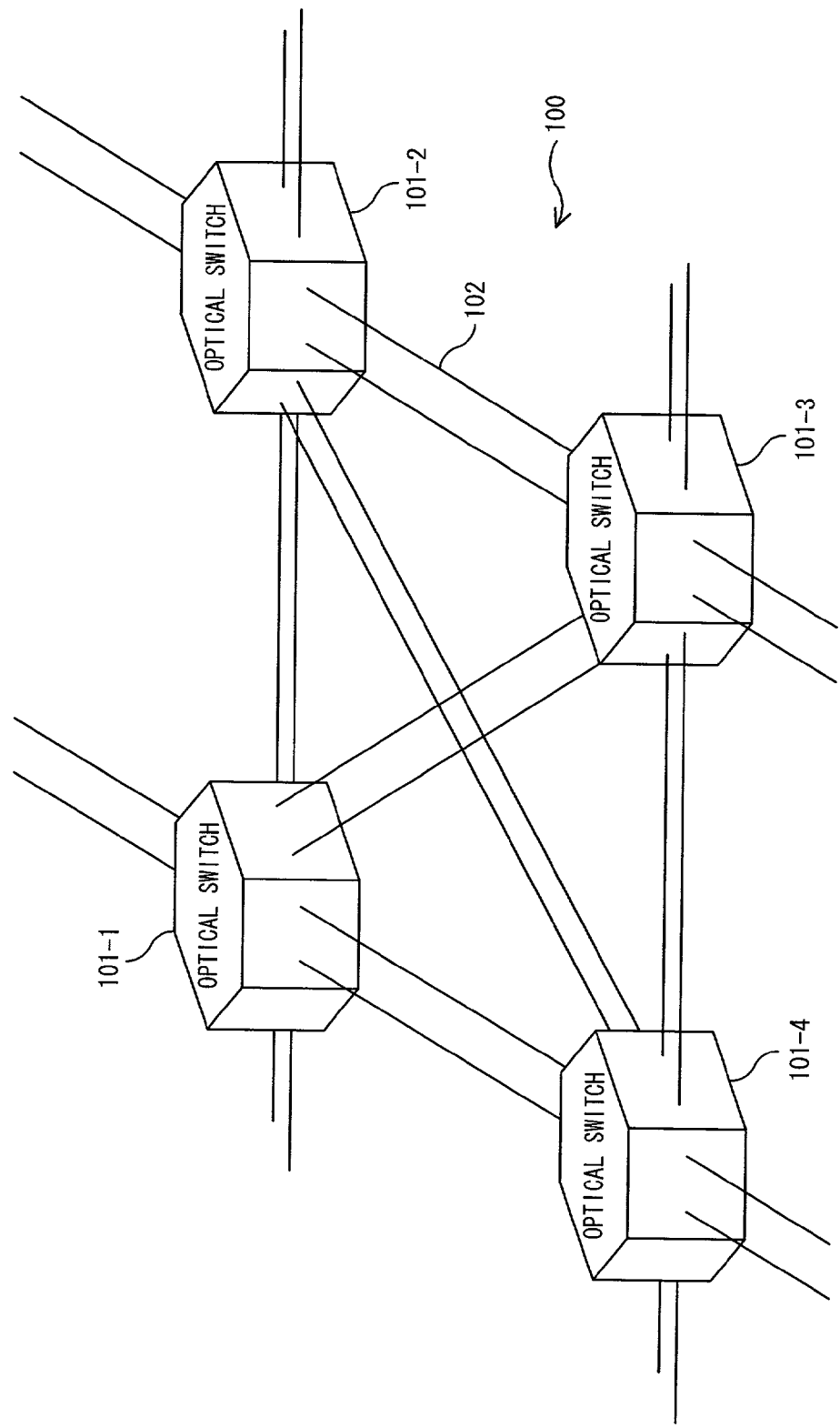
FIG. 14 is a diagram schematically showing a conventional optical cross-connect system, such as a conventional add/drop ring system, used in a trunk WDM network.
Figure 15:
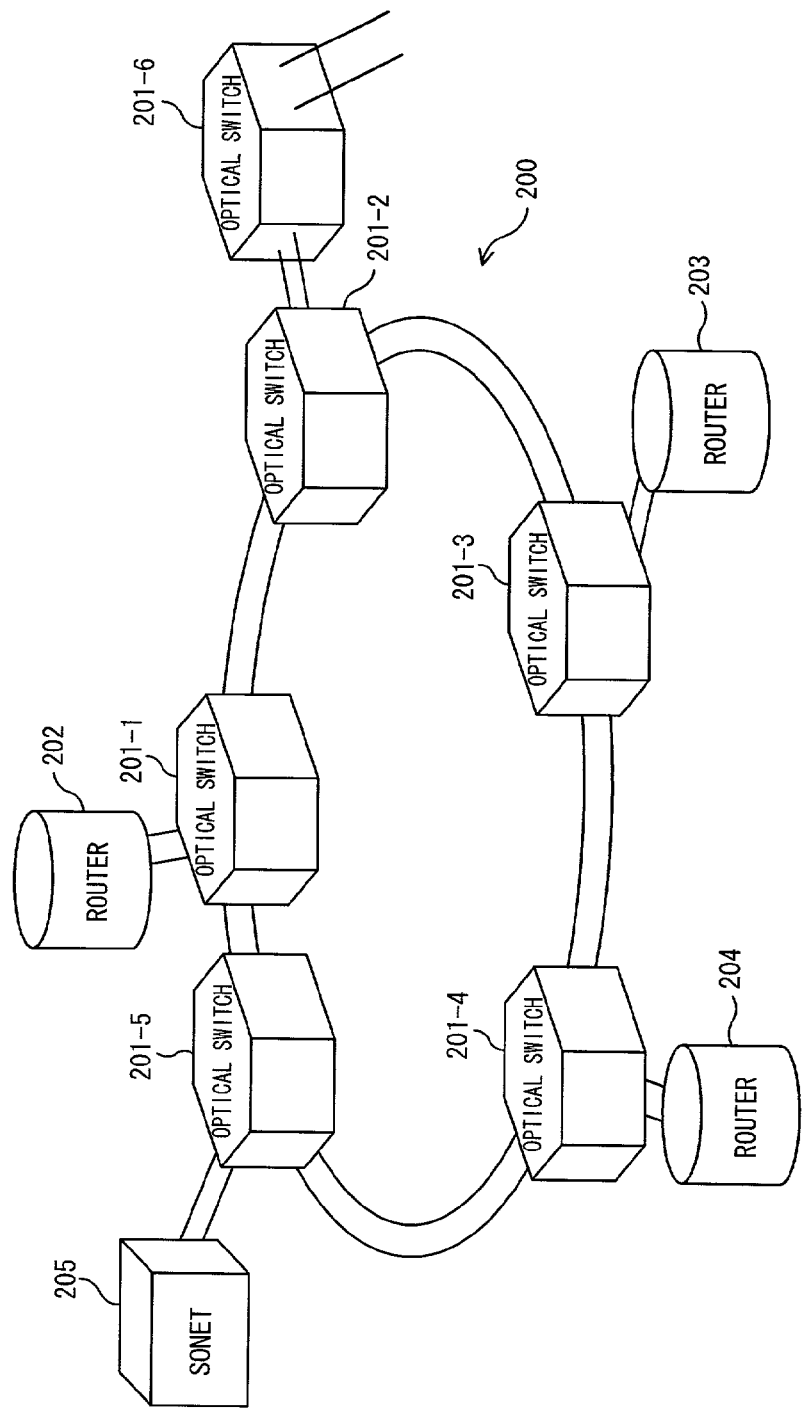
FIG. 15 is a block diagram showing a conventional add/drop ring system, such as a conventional OADM system, for WDM network.

As shown in FIG. 13, the switch device 2 may be in the form of a planar switch that is composed of a plurality of input collimate lenses (input ports) 2E, a plurality of output collimate lenses (output ports) 2F, a plurality of pieces of input electrooptic material (first deflection element) 2G, and a plurality of pieces of output electrooptic material (second deflection element) 2H. The input and output collimators 2E, 2F are arranged in two parallel rows corresponding one set of input and output collimate lenses to each of total WDM channels, and the input and output electrooptic material pieces 2G, 2H are arranged in two parallel rows corresponding one set of input and output electrooptic material pieces to each set of input and output collimate lenses; all sets of the input and output collimate lenses and all sets of the input and output electrooptic material pieces are disposed in a common plane. The individual input optical signal from one input collimate lens 2E is refracted by the corresponding first input electrooptic material piece 2G so as to deflect the input optical signal to a designated second output electrooptic material piece 2H, whereupon the once-refracted input optical signal is further refracted by the designated second output electro optic material piece 2H so that the twice-refracted input optical signal is output from the corresponding output collimate lens 2F, which is allocated to the one input collimate lens 2F.

The electrooptic material 2G, 2H is responsive to an electrical signal applied from the driving circuit 6 to adjustably vary the deflection angle of the incident optical signal. This planar switch 2 is small in size, and input-power-level equalization and gain-level equalization for the planar switch 2 can be controlled by the driving-circuit control circuit 5.

In the planar switch 2 of FIG. 13, the first and second deflecting elements should by no means be limited to the illustrated electro optic material and maybe an alternative known form.

What is claimed is:

1. An optical exchange for a wavelength division multiplexed (WDM) optical network, comprising:

(a) a plurality of input ports from which a plurality of optical signals are to be inputted;
(b) a plurality of output ports to be allocated one to each of said input ports;
(c) deflecting means for deflecting the optical signals, which are inputted via said input ports, and outputting the deflected optical signals to said output ports;
(d) storing means for storing deflection information about a plurality of target amounts of deflection to which the respective input optical signals are to be individually deflected by said deflecting means, one target amount for each of said output ports, which are to be allocated to the respective input ports; and
(e) controlling/driving means for controlling/driving said deflecting means so as to set amounts of deflection of the individual input optical signals based on the deflection information stored in said storing means; said controlling/driving means including
a driving circuit for driving said deflecting means so as to deflect traveling paths of the individual optical signals respectively to the selected destination-of-output ports, said driving circuit including
(e1) a switching controller, responsive to receipt of a switching control signal designating an output port as a destination of switching with respect to a particular input port as an object of switching, for reading out from said storing means the target amount of deflection for such destination-of-switching output port with respect to such object-of-switching port, and controlling said deflecting means in such a manner that said deflecting means deflects the individual input optical signals based on the respective target amounts of deflection that are read out from said storing means; and
(e2) a power-level controller for performing a feedback control on power levels of the individual output optical signals, from said output ports so that they are equalized to a target power level.

2. An optical exchange according to claim 1, wherein: said controlling/driving means further includes
(e3) a coupler for branching the individual optical signal, which is outputted from each said output port, into a plurality of optical signal components;
(e4) a monitor for monitoring the branched optical signal components; and
(e5) a driving-circuit controlling circuit for controlling said driving circuit, based on the deflection information stored in said storing means, so as to adjust the amount of deflection of the individual optical signal to be switched to the selected destination-of-output port; and
the feedback control by said power-level controller is such that the individual optical signal assumes the target power level based on the optical signal components monitored by said monitor.

3. An optical exchange according to claim 2, wherein said switching controller is operable to make a fine adjustment, which is necessary for practical deflection after completion of said deflection by the stored target amounts, based on the monitored actual power levels.

4. An optical exchange according to claim 1, wherein said deflecting means includes:
(b1) an input collimator array for collimating the individual optical signals inputted from said output ports;
(b2) a first mirror array composed of a plurality of first tilt mirrors, which are arranged in a plane and are as many as said output ports, each of the first tilt mirrors serving to reflect the individual collimated optical signal;

(b3) a second mirror array composed a plurality of second tilt mirrors, which are arranged in a plane and are as many as said output ports, each of the second tilt mirrors serving to reflect the individual optical signal that has been reflected by a current associated one of the first tilt mirror; and (b4) an output collimator array for collimating the resultant individual optical signals reflected by the second tilt mirrors and then outputting the last-named collimated optical signals to said output ports.

5. An optical exchange according to claim 1, wherein said deflecting means includes a planar switch for selectively outputting the individual input optical signals to said destination-of-output ports, said planar switch having:

a plurality of first optical-deflection elements, arranged in a row, for individually deflecting the individual optical signals input from said input ports; and a plurality of second optical-deflection elements, arranged in a row parallel to the row of said first optical-deflection elements in a common plane, for individually deflecting the resultant individual optical signals deflected by said first deflection elements and then outputting the last-named deflected optical signals to said destination-of-output ports.

6. An optical exchange for a wavelength division multiplexed optical network, comprising:

a plurality of input ports from which a plurality of optical signals are to be inputted;

a plurality of output ports to be allocated one to each of said input ports;

deflecting means for deflecting the optical signals, which are inputted via said input ports, and outputting the deflected optical signals to said output ports;

storing means for storing deflection information about a plurality of target amounts of deflection to which the respective input optical signals are to be individually deflected by said defecting means, one target amount for each of said output ports, which are to be allocated to the respective input ports; and controlling/driving means for controlling/driving said deflecting means so as to set amounts of deflection of the individual input optical signals based on the deflection information stored in said storing means, said controlling/driving means including a driving circuit for driving said deflecting means so as to deflect traveling paths of the individual optical signals respectively to the selected destination-of-output ports, said driving circuit including a switching controller, responsive to receipt of a switching control signal designating an output port as a destination of switching with respect to a particular input port as an object of switching, for reading out from said storing means the target amount of deflection for such destination-of-switching output port with respect to such object-of-switching port, and controlling said deflecting means in such a manner that said deflecting means deflects the individual input optical signals based on the respective target amounts of deflection that are read out from said storing means; and a power-level controller for performing a feedback control adjusting a power level of the individual output optical signal, which is received from said deflecting means via the destination output port, to a target power level, the feedback control adjustment by said power-level controller is such that the lowest one among power levels of the optical signals to be outputted is detected, and that the remaining power levels are equalized to the detected lowest power level.

7. An optical exchange for a wavelength division multiplexed optical network, comprising:

a plurality of input ports from which a plurality of optical signals are to be inputted;

a plurality of output ports to be allocated one to each of said input ports;

deflecting means for deflecting the optical signals, which are inputted via said input ports, and outputting the deflected optical signals to said output ports;

storing means for storing deflection information about a plurality of target amounts of deflection to which the respective input optical signals are to be individually deflected by said defecting means, one target amount for each of said output ports, which are to be allocated to the respective input ports; and controlling/driving means for controlling/driving said deflecting means so as to set amounts of deflection of the individual input optical signals based on the deflection information stored in said storing means, said controlling/driving means including a driving circuit for driving said deflecting means so as to deflect traveling paths of the individual optical signals respectively to the selected destination-of-output ports, said driving circuit including a switching controller, responsive to receipt of a switching control signal designating an output port as a destination of switching with respect to a particular input port as an object of switching, for reading out from said storing means the target amount of deflection for such destination-of-switching output port with respect to such object-of-switching port, and controlling said deflecting means in such a manner that said deflecting means deflects the individual input optical signals based on the respective target amounts of deflection that are read out from said storing means;

a power-level controller for performing a feedback control adjusting a power level of the individual output optical signal, which is received from said deflecting means via the designated output port, to a target power level;

a coupler for branching the individual optical signal, which is outputted from each said output port, into a plurality of optical signal components;

a monitor for monitoring the optical signal components, where the feedback control by said power-level controller causes the individual optical signal to assume the target power level based on the optical signal components monitored by said monitor and said power-level controller obtains wavelength characteristics of an external optical device, which is communicably connectable with said output ports, and performs the feedback control such that the individual power levels of the respective optical signal components monitored by said monitor are attenuated in accordance with the obtained wavelength characteristics of the external optical device; and a driving-circuit controlling circuit for controlling said driving circuit; based on the deflection information stored in said storing means, so as to adjust the amount of deflection of the individual optical signal to be switched to the selected destination-of-output port.

8. An optical exchange according to claim 7, wherein said power-level controller obtains wavelength characteristics of an external optical device, which is communicably connectable with said output ports, and performs the feedback control such that necessary amounts of attenuating the individual power levels of the respective optical signal components monitored by said monitor are calculated in accordance with the obtained wavelength characteristics of the external optical device so as to equalize the power levels of the individual resultant optical signals to be outputted from the external optical device.

9. An optical exchange according to claim 8, wherein
said storing means serves to hold the wavelength characteristics of the external device; and
said power-level controller performs the feedback control based on the wavelength characteristics held by said storing means.

10. An optical exchange according to claim 8, wherein the external optical device is an optical amplifier.

11. An optical exchange according to claim 7, wherein:
said storing means serves to hold the wavelength characteristics of the external device; and
said power-level controller performs the feedback control based on the wavelength characteristics held by said storing means.

12. An optical exchange according to claim 7, wherein the external optical device is an optical amplifier.

13. An optical exchange method for a wavelength division multiplexed (WDM) optical network, comprising:
(a) providing an optical exchange having a plurality of input ports and a plurality of output ports to be allocated one to each of the input ports;
(b) inputting a plurality of optical signals to said exchange via the input ports, respectively;
(c) deflecting the individual optical signals, which are inputted via the input ports, and outputting the deflected optical signals to said output ports;
(d) obtaining deflection information about a plurality of target amounts of deflection to which the respective input optical signals are to be individually deflected by said deflecting, one target amount for each of the output ports, which are allocated to the respective input ports; and
(e) controlling said deflecting so as to set amounts of deflection of the individual input optical signals based on the deflection information obtained by said obtaining, said controlling including upon receipt of a switching control signal designating an output port as a destination of switching with respect to a particular input port as an object of switching, at the provided optical exchange
(e1) reading out from the deflection information, which is obtained by said obtaining, the target amounts of deflection for such destination-of-switching output port with respect to each object-of-switching port, and controlling said deflecting in such a manner that the individual input optical signals are deflected based on the respective target amounts of deflection that are read out by said reading; and
(e2) performing a feedback control on power levels of the individual output optical signals from the output ports so that they are equalized to a target power level.

14. An optical exchange method for a wavelength division multiplexed optical network, comprising:
providing an optical exchange having a plurality of input ports and a plurality of output ports to be allocated one to each of the input ports;
inputting a plurality of optical signals to said exchange via the input ports, respectively;
deflecting the individual optical signals, which are inputted via the input ports, and outputting the deflected optical signals to the output ports;
obtaining deflection information about a plurality of target amounts of deflection to which the respective input optical signals are to be individually deflected by said deflecting, one target amount for each of the output ports, which are allocated to the respective input ports; and
controlling said deflecting so as to set amounts of deflection of the individual input optical signals based on the deflection information obtained by said obtaining;
said controlling including upon receipt of a switching control signal designating an output port as a destination of switching with respect to a particular input port as an object of switching, at the provided optical exchange
reading out from the deflection information, which is obtained by said obtaining, the target amounts of deflection for such destination-of-switching output port with respect to each object-of-switching port, and controlling said deflecting in such a manner that the individual input optical signals are deflected based on the respective target amounts of deflection that are read out by said reading;
performing a feedback control adjusting a power level of the individual output optical signal, which is the signal as the result of said deflecting and is obtained via the designated output port, to a target power level;
detecting the lowest one among power levels of the optical signals by monitoring all the individual optical signals and comparing the monitored optical signals with one another in power level; and
attenuating the remaining power levels to the detected lowest power level, so as to equalize all the individual power levels, by performing the feedback control, which controls each of the deflect amounts of the individual optical signals.

15. An optical exchange method according to claim 14, wherein said controlling further includes setting a minimum threshold value for the power levels to be compared in said detecting.

16. An optical exchange method for a wavelength division multiplexed optical network, comprising:
providing an optical exchange having a plurality of input ports and a plurality of output ports to be allocated one to each of the input ports;
inputting a plurality of optical signals to said exchange via the input ports, respectively;
deflecting the individual optical signals, which are inputted via the input ports, and outputting the deflected optical signals to the output ports;
obtaining deflection information about a plurality of target amounts of deflection to which the respective input optical signals are to be individually deflected by said deflecting, one target amount for each of the output ports, which are allocated to the respective input ports; and controlling said deflecting so as to set amounts of deflection of the individual input optical signals based on the deflection information obtained by said obtaining, said controlling including upon receipt of a switching control signal designating an output port as a destination of switching with respect to a particular input port as an object of switching, at the provided optical exchange reading out from the deflection information, which is obtained by said obtaining, the target amounts of deflection for such destination-of-switching output port with respect to each object-of-switching port, and controlling said deflecting in such a manner that the individual input optical signals are deflected based on the respective target amounts of deflection that are read out by said reading; and performing a feedback control adjusting a power level of the individual output optical signal, which is the signal as the result of said deflecting and is obtained via the designated output port, to a target power level;

detecting the lowest one among power levels of the optical signals by monitoring the individual optical signals and comparing the monitored power signals with one another in power level;

attenuating the remaining power levels to the detected lowest power level;

reading out from the storage device the target-gain-attenuation information; and further attenuating the attenuated power levels, which result from said attenuating performed initially, based on the read target-gain-attenuation information, so as to equalize the individual power levels of the gain at the external optical device, by performing the feedback control, which controls each of the deflect amounts of the individual optical signals; and storing, in a storage device, gain-attenuation information about a plurality of amounts of target gain-attenuation by which the power levels of the individual optical signals are to be respectively attenuated based on wavelength characteristics of a gain at an external optical device which is communicatively connectable with the output ports.

17. An optical exchange method according to claim 16, wherein said controlling further includes setting a minimum threshold value for the power levels to be compared in said detecting.

18. An optical exchange method for a wavelength division multiplexed optical network, comprising:

providing an optical exchange having a plurality of input ports and a plurality of output ports to be allocated one to each of the input ports;

inputting a plurality of optical signals to said exchange via the input ports, respectively;

deflecting the individual optical signals, which are inputted via the input ports, and outputting the deflected optical signals to the output ports;

obtaining deflection information about a plurality of target amounts of deflection to which the respective input optical signals are to be individually deflected by said deflecting, one target amount for each of the output ports, which are allocated to the respective input ports; and controlling said deflecting so as to set amounts of deflection of the individual input optical signals based on the deflection information obtained by said obtaining, said controlling including upon receipt of a switching control signal designating an output port as a destination of switching with respect to a particular input port as an object of switching, at the provided optical exchange, reading out from the deflection information, which is obtained by said obtaining, the target amounts of deflection for such destination-of-switching output port with respect to each object-of-switching port, and controlling said deflecting in such a manner that the individual input optical signals are deflected based on the respective target amounts of deflection that are read out by said reading;

performing a feedback control adjusting a power level of the individual output optical signal, which is the signal as the result of said deflecting and is obtained via the designated output port, to a target power level;

monitoring the respective power levels of the individual optical signals;

calculating a plurality of target amounts of gain attenuation by which the power levels of the individual optical signals are to be respectively attenuated based on both the monitored optical power levels and wavelength characteristics of a gain of an external optical device which is communicatively connectable with the output ports; and attenuating the individual power levels of the optical signals to the respective calculated target amounts by performing the feedback control, which controls each of the deflect amounts of the individual optical signals.

19. An optical exchange for a wavelength division multiplexed optical network, comprising:

input ports, each accepting a plurality of optical signals as input;

output ports, each of which are allocated to one input port;

deflection unit deflecting the optical signals, which are inputted via said input ports, and outputting the deflected optical signals to said output ports;

storage unit storing deflection information including target levels of deflection to which the respective input optical signals are to be individually deflected by said deflection unit, one target level for each output port; and controller/driver unit controlling and driving said deflection unit to set levels of deflection of the individual input optical signals based on the deflection information stored in said storage unit, said controller/driver unit including a driving circuit for driving said deflection unit so as to deflect traveling paths of the individual optical signals respectively to the selected destination-of-output ports, said driving circuit including a switching controller, responsive to receipt of a switching control signal designating an output port as a destination of switching with respect to a particular input port as an object of switching, for reading out from said storage unit the target level of deflection for such destination-of-switching output port with respect to such object-of-switching port, and controlling said deflection unit to deflect individual input optical signals based on the respective target levels of deflection that are read out from said storage unit, and a power-level controller for performing a feedback control on power levels of the individual output optical signals, from said output ports, so that they are equalized to a target power level.

* * * * *